United States Patent [19]
van Weele et al.

[11] Patent Number: 5,631,825
[45] Date of Patent: May 20, 1997

[54] OPERATOR STATION FOR MANUFACTURING PROCESS CONTROL SYSTEM

[75] Inventors: Leonardus A. van Weele, Terneuzen; Ronny P. de Bruijn, Jansteen; Roger R. Vermeire, Terneuzen, all of Netherlands; Christo Zemering, Midland, Mich.; Ben Lenting, Auckland, New Zealand

[73] Assignee: Dow Benelux N.V., Netherlands

[21] Appl. No.: 128,988

[22] Filed: Sep. 29, 1993

[51] Int. Cl.$^6$ .................................................. G05B 11/01
[52] U.S. Cl. ............................................ 364/188; 364/146
[58] Field of Search .................................. 364/188–193, 364/146–147, 474.22–474.27; 395/155–167

[56] References Cited

U.S. PATENT DOCUMENTS

| | | |
|---|---|---|
| 1,089,798 | 3/1914 | Smith . |
| 1,108,989 | 9/1914 | Henry . |
| 1,118,597 | 11/1914 | Taggart et al. . |
| 2,340,559 | 2/1944 | Pruyn et al. . |
| 3,275,988 | 9/1966 | Yetter . |
| 4,001,807 | 1/1977 | Dallimonti . |
| 4,115,848 | 9/1978 | Kogure et al. . |
| 4,303,973 | 12/1981 | Williamson, Jr. et al. . |
| 4,396,977 | 8/1983 | Slater et al. . |
| 4,413,314 | 11/1983 | Slater et al. . |
| 4,586,144 | 4/1986 | Fukumoto . |
| 4,628,470 | 12/1986 | Baumann . |
| 4,675,147 | 6/1987 | Schaefer et al. . |
| 4,683,549 | 7/1987 | Takaki . |
| 4,727,473 | 2/1988 | Anderson et al. . |
| 4,752,889 | 6/1988 | Rappaport et al. . |
| 4,792,888 | 12/1988 | Agarwal et al. . |
| 4,803,039 | 2/1989 | Impink, Jr. et al. . |
| 4,815,014 | 3/1989 | Lipner et al. . |
| 5,168,441 | 12/1992 | Onarheim et al. ......... 364/188 |

OTHER PUBLICATIONS

Morten Lind, "Modelling Control Tasks in Complex Systems", Institute of Automatic Control Systems, Technical Univ. of Denmark, 90–C–388, 1990, pp. 1–18.

Jason Gait, "An Aspect of Aesthetics in Human–Computer Communications: Pretty Windows" IEEE Transactions on Software Engineering, vol. SE–11,No. 8, Aug., 1985, pp. 714–717.

Samuel M. Herb, "Technology Improves Process Control Displays", I&CS–The Industrial and Process Control Magazine, May, 1984, pp. 45–49.

Robert L. Paradis, et al, "Building Performance Indices: Raw–Data Distillation for Process Optimization", InTech, Sep., 1986, pp. 55–58.

Peter Wong et al., "Flair–User Interface Dialog Design Tool", Computer Graphics, Jul., 1982, vol. 16, No. 3, pp. 87–98.

N. Praetorius et al., "Flow Representation of Plant Processes for Fault Diagnosis", Behavior & Information Technology, 1991, vol. 10, No. 1. 41–52.

Veronique de Keyser, "Technical Assistance to the Operator in Case of Incident: Some Lines of Thought", Nato ASI Series, vol. F21, 1986, pp. 229–253.

*Primary Examiner*—James P. Trammell
*Attorney, Agent, or Firm*—Brooks & Kushman

[57] ABSTRACT

An operator station for a manufacturing process control system including a network of at least one dedicated process control computer for monitoring and controlling SECTIONS of the manufacturing process wherein each SECTION includes one or more SEQUENCES of the manufacturing process, the operator station includes a processor, a communication link to the process control communication system, a display including a SECTIONS window providing information relating to at least one of the SECTIONS monitored by the operating station and a SEQUENCE window providing information relating to one or more SEQUENCES monitored by the operator station, a data input device for selecting a SECTION from which information is to be displayed. The operator station may further include a flow sheet display window which includes a graphic depiction of a portion of the process, and a trend display window which includes current and historical information in graphic form for selected process control variables.

16 Claims, 15 Drawing Sheets

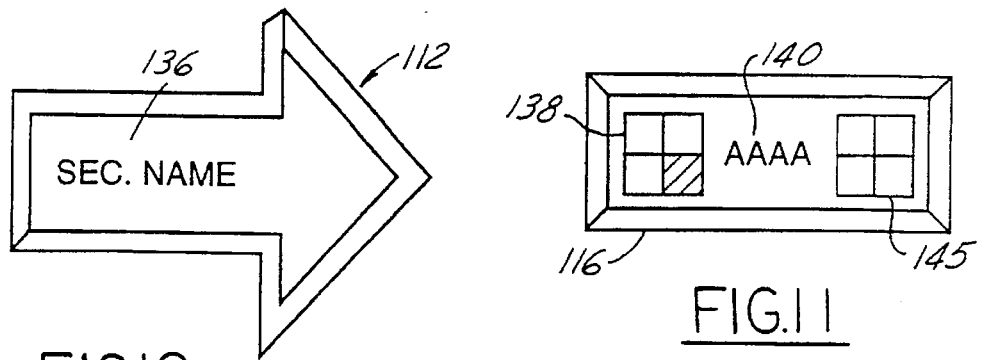
FIG.10
FIG.11
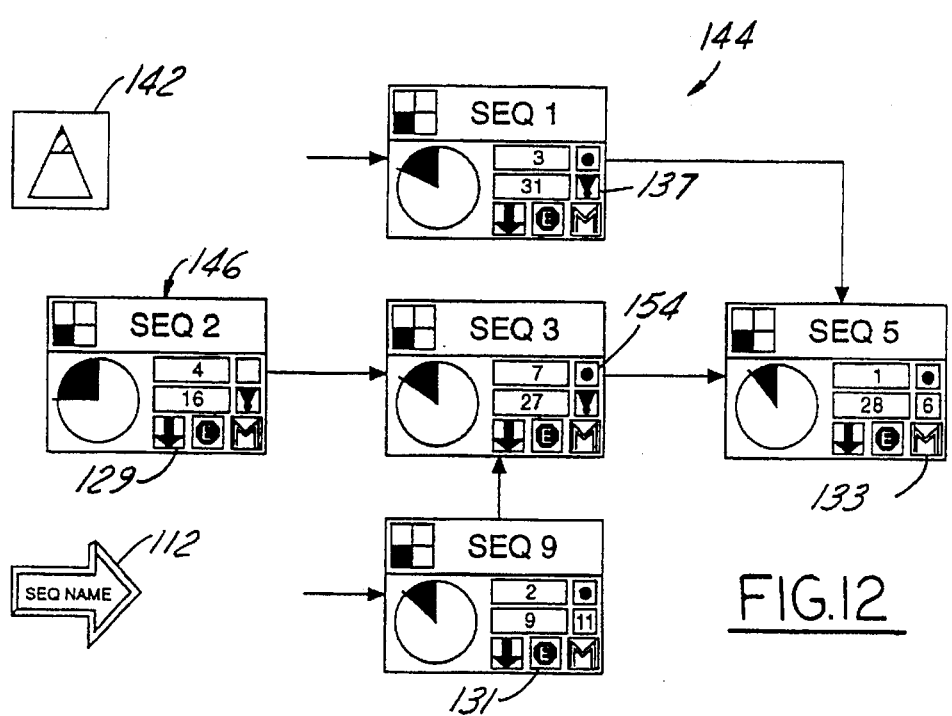
FIG.12
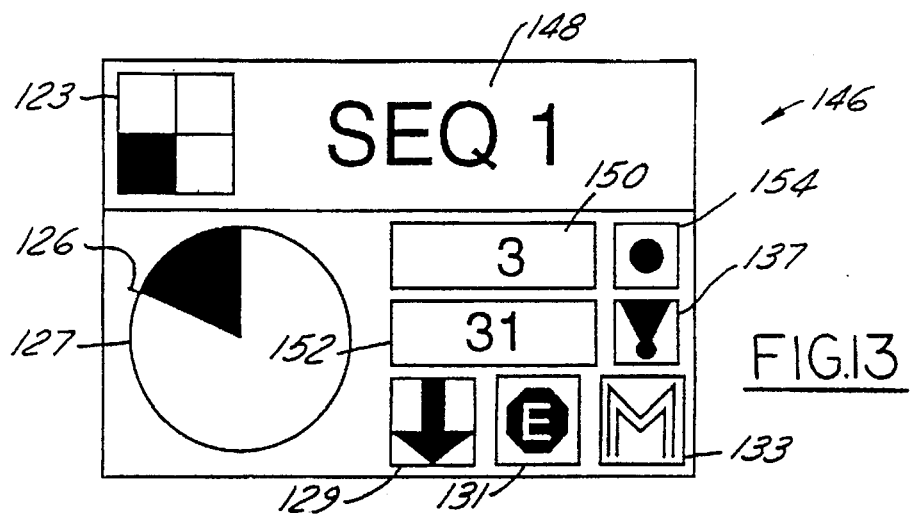
FIG.13

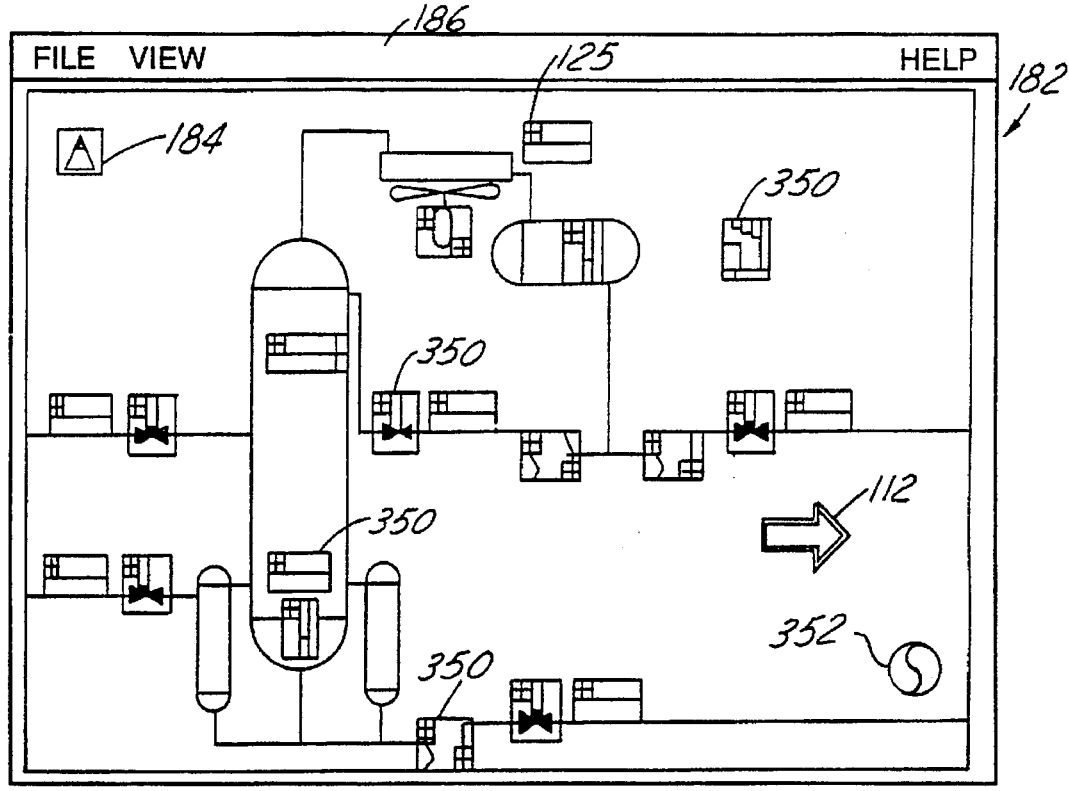
FIG.17
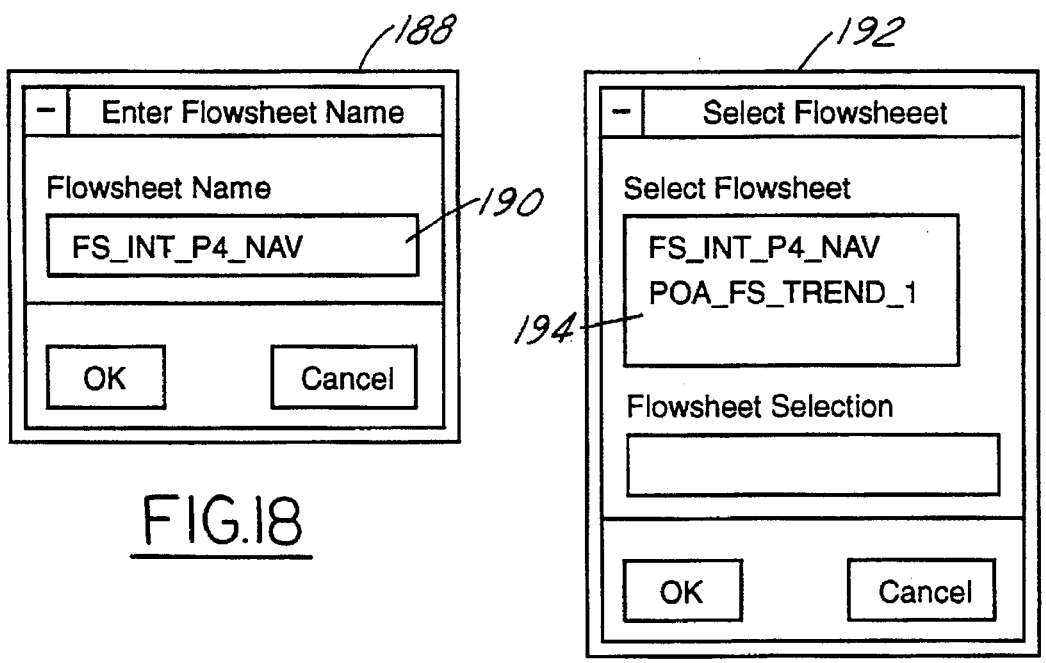
FIG.18
FIG.19

FIG.28

OPERATOR STATION FOR MANUFACTURING PROCESS CONTROL SYSTEM

TECHNICAL FIELD

The present invention relates to manufacturing process control systems, and more particularly to an operator station which provides information and allows supervision and control of one or more manufacturing processes by a human operator.

BACKGROUND

Complex manufacturing processes such as, for example, chemical manufacturing processes, typically involve many steps, each of which utilizes different inputs and different processing equipment. These process steps may occur in series or in parallel or both, and may or may not be time dependent upon the completion of other steps in the process. It is well known to utilize process control computers to collect information relating to a single step or number of steps in a process and display that information in a format recognizable by a human operator. It is also well known to utilize appropriately programmed computers to automate selected steps of a manufacturing process, thereby reducing the need for constant human interaction with each of the process components during processing. These process control computers may virtually automate one or more steps in a process, while providing information in human readable format to allow for human monitoring with human control limited to fine tuning of the process or crisis intervention.

For simpler manufacturing processes, the complete process may be automated through the use of a process control computer. However, larger and/or more complex manufacturing processes are effected through the of a plurality of process control computers, each controlling a portion of the complete manufacturing process.

Process Terminology

The effective control and supervision of a complex manufacturing process involves assimilation of information from three domains or realms. As used herein, the terms "datalogical," "infological," and "physical" are each used to denote different realms or domains associated with process control. The physical realm includes the physical components of a process, such as, for example, a pump, or its associated inputs and outputs. The datalogical realm includes computer representations of data, such as, variables, flags, etc., which are defined and utilized by the computer. In contrast, the infological realm is human-interface oriented data which may represent, or is derived from, the physical realm or the datalogical realm. The change in physical quality may have datalogical as well as infological implications. For example, a switch changing from closed to open (an event in the physical realm) may change the datalogical quality of a digital variable (e.g., from TRUE to FALSE or OFF to ON) corresponding to the computer representation of the state of the switch. At the same time, the change in state of the switch may mean that, for example, a pump is on. In the infological realm this same event may be represented as a flashing or color-coded icon representing the pump, or by the words "Pump On," or "Flow Equals 100 CFM" appearing on a display. As will be appreciated by those skilled in the art, the control of a manufacturing process involves each of the physical, datalogical and infological realms. Through the efficient mapping of information within these realms a human operator can more effectively supervise and control the manufacturing process.

To more efficiently control and supervise increasingly complex manufacturing processes, the physical, datalogical, and informational attributes associated with these processes have been subdivided into a plurality of SEQUENCES. A SEQUENCE is an infological construct (or object) which has associated with it a set of physical components which are utilized in the process, such as a boiler and the input valves and output valves associated with the boiler. The domain of a SEQUENCE also may include selected inputs (digital or analog) from the physical components of the manufacturing process, as well as selected variables, such as those defined and utilized in the process control computers. Another attribute associated with a SEQUENCE includes the set of steps involving the physical components associated with that SEQUENCE, which steps are defined in a manufacturing process control program implemented by a process control computer. It should be noted that, despite its name, the steps in a SEQUENCE are not necessarily implemented sequentially. That is, a SEQUENCE may change from one step (or state) to any other step in the SEQUENCE, not necessarily "the next" step on the list. Other common data attributes of a SEQUENCE are alarms, recipes, and minimum/maximum values for selected variables.

Thus, while a SEQUENCE in its narrowest sense may be associated with a set of steps or physical components associated with a manufacturing process, a SEQUENCE may be broadly considered to define a domain associated with a manufacturing process that includes physical components associated with the process, data associated with the process, and other infological elements derived from, or representative of, combinations of physical elements and/or data associated with the process. As used hereinafter, SEQUENCE is intended in this broader definition which encompasses attributes from each of the physical, datalogical, and infological realms.

It should be noted that certain elements such as, for example, variables, may be associated with more than one SEQUENCE. That is, an attribute of a SEQUENCE is not necessarily uniquely associated with that SEQUENCE, but may also be an attribute of a different SEQUENCE.

As used herein, process "primitives" are the operator station symbols representing (1) basic points of control interaction between the PCC and the physical process and (2) other variables in the PCC. Primitives include, for example, symbols identified with PCC variables, such as component quantities, process parameters, digital and analog inputs and outputs, and PCC-defined variables and alarms.

"Recipes" are collections of data referenced within a SEQUENCE which enable variables coded in a genus context to represent a particular species of product, raw material, and/or manufacturing process. In a chemical manufacturing process cycle, recipes typically include a list of related component quantities and process parameters which will remain fixed during that cycle. As an example of the use of recipes, consider a reactor system programmed generically to use a RECIPE_WEIGHT of component A, to heat to a RECIPE_TEMPERATURE, and to store the product in the RECIPE_PRODUCT_TANK. In a manufacturing cycle to produce chemical #1, the recipe values will be:

RECIPE_WEIGHT=500 lbs
RECIPE_TEMPERATURE=120 deg C.
RECIPE_PRODUCT TANK=4

In the subsequent manufacturing cycle to produce chemical #2, which will use the same steps as were used by chemical #1, the recipe values will be:

RECIPE_WEIGHT=800 lbs

RECIPE_TEMPERATURE=130 deg C.
RECIPE_PRODUCT_TANK=1

The PCC code for the equipment is written to add component A until the (generic variable) RECIPE_WEIGHT is achieved, to then heat component A to the RECIPE TEMPERATURE, and to open a valve to storage based upon the RECIPE_PRODUCT_TANK. As is apparent to one skilled in this art, the "Recipe" feature in the system enables PCC code to be written for a family of chemicals and then used to make different species of the family (or genus) without the need for reprogramming or substantial manual alteration of PCC variables as the system moves from species to species in its subsequent manufacturing cycles. The only input necessary for the species variables to be included is that the SEQUENCE be instructed to make either chemical #1 or chemical #2 as the recipe for that manufacturing cycle—the PCC will then select the appropriate set of recipe values to be used whenever a recipe generic variable is referenced in the control program.

"Alarms" are variables associated with elements in the process (which have their own process primitives) utilized to signal abnormal or unstable situations. Various categories of alarms may be implemented to indicate, for example, different levels of significance to the process. In many of the chemical processes controlled by PCCs at The Dow Chemical Company, six alarm categories are utilized. These categories are (in descending order of degree of severity) Shutdown Alarms, Emergency Alarms, Warning Alarms, Alert Alarms, Min/Max Alarms, and Request alarms.

When an alarm variable has changed to the "on" or "active" state, the PCC regards it as an unacknowledged alarm, until an operator has taken action to acknowledge the particular alarm. An acknowledgement action typically includes either activating a hardware switch associated with the alarm variable or setting a software switch associated with the variable through a control interface such as the operator station of the present invention.

As with alarms, a "manual" variable in the PCC has an associated state (on/off or manual/automatic) that is depicted by a corresponding state of a process primitive associated with the variable in the PCC. As used herein, when a process variable is in "manual," the value of the associated process primitive (whether it be an input or output) needs to indicate if the variable has been manually input or overridden by the operator. This manual override of the associated primitive, which is otherwise either automatically created by the PCC system or detected by the PCC from the field, may be accomplished by a hardware override (for example by flipping a switch or setting a thumb wheel), or by changing the value of the associated process primitive through the operator station via the "Change" command or by enabling a "Manual Data Write" as hereafter described. The former manual override may be referred to as a "hard manual," while the latter manual override, effected through the operator station, may be referred to as a "soft manual."

Thus, the increasing scope and complexity of manufacturing processes, and the process control computers associated with those processes, creates a need for an efficient man/machine interface which effectively manages and utilizes physical, datalogical, and infological attributes associated with the manufacturing process and its associated process control computer(s) to convey process information to a human operator/supervisor in real-time. These interfaces, hereinafter referred to as "operator stations" must provide the operator/supervisor with the ability to supervise increasingly larger and more complex operations.

As used herein, real-time processing is generically defined as a method of processing in which an event causes a given reaction within an actual time limit and wherein computer actions are specifically controlled within the context of and by external conditions and actual times. As an associated clarification in the realm of process control, real-time processing relates to the performance of associated process control logical, decision, and quantitative operations intrinsic to a process control decision program functioning as part of a controlled apparatus and its associated process wherein the process control decision program is periodically executed with fairly high frequency usually having a period of between 20 ms and 2 sec, although other time periods could be also utilized and some operations might be performed on an integer multiple of the primary process control decision program execution period for purposes related to either tuning, sensitivity, or efficient resource utilization.

Furthermore, existing process control computers typically provide information in human readable format to allow an operator to supervise and control that portion of the manufacturing process. However, when a conventional operator station receives information from, and transmits control signals to, more than one process control computer, the increased volume of process data presents an increasingly serious sensory overload upon the human operator responsible for supervision and control of the system.

A method is needed to present the data in an organized context to minimize the amount of data required by the operator in order to efficiently supervise the ongoing process. A system is needed to present the expanded amount of data in an organized context which minimizes the sensory overload for the human operator while enabling the human operator to effectively manage the more complex process control situation; the present invention fulfills these needs.

One object of the present invention is to provide an operator station which provides selected process data from at least two dedicated process control computers for simultaneous monitoring and control of the portions of the manufacturing process governed by each of the dedicated process control computers.

Another object of the present invention is to provide an operator station which provides to a human operator information for, and allows supervision and control of, a plurality of SEQUENCES of one or more manufacturing processes.

Another object of the present invention is to provide an operator station for a manufacturing process control system including a fixed format display providing selected information relating to each of one or more pre-defined SECTIONS (as hereafter defined) monitored by the system, selected information relating to a selected one or more of the SEQUENCES monitored by the system, and one or more additional displays which may be varied in the format of presentation of selected process data relating to the manufacturing processes supervised and controlled through the operator station.

Another object of the present invention is to provide an operator station for a manufacturing process control system including infological objects which graphically and succinctly communicate to the operator the current status of a SECTION, where the infological object is a composite of preselected parameters associated with the SECTION.

Another object of the present invention is to provide an operator station for a manufacturing process control system including infological objects which graphically and succinctly communicate to the operator the current status of a SEQUENCE, where the infological object is a composite of preselected parameters associated with the SEQUENCE.

Another object of the present invention is to provide an operator station for a manufacturing process control system including infological objects which graphically and succinctly communicate to the operator the current status of a predefined collection of PCC variables represented by process primitives, where the infological object is a composite of preselected parameters associated with a physical field device or controller.

Another object of the present invention is to provide an operator station for a manufacturing process control system including a display having a fixed format including a first window with standard graphic indicia representing the status of preselected parameters for the SECTIONS of the processes, a second window with standard graphic indicia representing the current status of one or more selected SEQUENCES in the process, a third window including information in the form of a graphic sheet, such as a flowsheet, including standardized graphic indicia identifying the significant steps or components in a selected SEQUENCE of the process, and selected additional process data relating to those steps and components.

Another object of the present invention is to provide an operator station for a manufacturing process control system including a display having a fixed format including a first window with standard graphic indicia representing the status of preselected parameters for the SECTIONS of the processes, a second window with standard graphic indicia representing the current status of one or more selected SEQUENCES in the process, a third window including information in the form of a flowsheet including standardized graphic indicia identifying the significant steps or components in a selected SECTION of the process, and selected additional process data relating to those steps and components.

It is another object of the present invention to provide an operator station which presents process data relating to a plurality of manufacturing processes, thereby enabling human supervision of the plurality of manufacturing processes from a single physical location.

DISCLOSURE OF INVENTION

In carrying out the above and other objects, the operator station of the present invention includes at least one dedicated process control computer (PCC) for monitoring and controlling at least one SEQUENCE of the manufacturing process, communication means for two-way communication of process data between the operator station and the PCC, display means including information relating to one or more SEQUENCES of the process controlled by one of the PCC and display means including information relating to one or more SEQUENCES of the process controlled by a second process control computer, data input means for selecting one of the SEQUENCES controlled by one of the PCCs and another SEQUENCE controlled by a second of the PCCs, and logic for displaying information in the SEQUENCE display area corresponding to each of the selected SEQUENCES.

The operator station of the present invention may also include a primary display including information relating to at least one SECTION of the manufacturing process. As used herein, a SECTION is a logical collection of process SEQUENCES, representing an area of responsibility that might be assigned to an individual using an operator station. A SECTION may, for example, contain one or more SEQUENCES monitored by a single dedicated process control computer, or it may include SEQUENCES from a plurality of process control computers. Similarly, the SEQUENCES in a particular SECTION may be either a logical subset of a single chemical processing system or a logical subset of SEQUENCES from different chemical processing systems. Thus, for example, if two chemical processing systems are operating in a plant, each having similar boiler SEQUENCES, these SEQUENCES may be grouped into a SECTION for common monitoring and control at one operator station.

As will be appreciated by those skilled in the art, like a SEQUENCE, a SECTION defines a domain in each of the physical, datalogical, and infological realms. Thus, physical components may be associated with a particular SECTION. In addition, data, such as variables, alarms, and min/max values defined in one or more of the PCCs, may be attributes of a particular SECTION. Finally, infological objects, such as the SECTION indicators, SEQUENCE indicators, and Critical Success Factor indicators (all hereinafter described in greater detail), as well as other graphic symbols representative of the state of some portion of the process, may be associated with a SECTION.

The operator station of the present invention may also include secondary display means including at least one window defining a display area including selected information relating to the manufacturing process, data input means for selecting one of the SECTIONS displayed in the first window of the first display and for selecting the information to be displayed on the second display, and logic for displaying selected information in at least one window on the second display means.

The operator station of the present invention may also include a graphical indicator of the current overall status of a selected SEQUENCE of the process represented as a Critical Success Factor (CSF) indicator which is a function of preselected parameters associated with the process. The CSF indicator may be represented graphically as a circle divided into two contrasting shades forming a pie chart wherein the area of the pie defined by one of the shades is a function of the value of the CSF, and further including a radial line segment that indicates the value of the trailing average of the CSF.

The operator station of the present invention also preferably includes other graphical indicators (also referred to herein as "infological objects" or "icons") which indicate the status of selected process parameters in a standard format, often at fixed locations on the display means, for quick and easy communication of process information by the operator.

In the preferred embodiment, these graphical indicators are color coded to indicate relative levels of criticality. It should, however, be noted that much of the background and contextual information is displayed in gray scale to enhance the contrast between the general environment and the critical information contained in the color coded graphical indicators.

The display means may also further include a flowsheet display area for displaying at least one graphic sheet including a graphic representation of the portion of the process, data input means for selecting one of the graphic sheets for display in the flowsheet display means, and logic for displaying information in the flowsheet display area corresponding to a selected one of the graphic sheets.

The display means may also further include a trend display area including at least one graph displaying the value of a selected process primitive for a preselected period of time.

The operator station of the present invention also may include information displayed in the SEQUENCE display area including a SEQUENCE indicator for each SEQUENCE in a preselected one of the SECTIONS supervised by the operator station. Each SEQUENCE indicator preferably includes text identifying the SEQUENCE by name, a status indicator, a CSF indicator symbol, a Current Step Number, a Hold-in-Step indicator, an Active Acknowledged Alarm Number, a shutdown flag indicator, an emergency flag, a Min/Max alarm indicator, and an unacknowledged alarm attention indicator all as hereinafter further defined.

The operator station of the present invention also preferably includes data input means for selecting one of the SEQUENCE indicators displayed in the SEQUENCE display area and logic for displaying additional numerical data corresponding to preselected parameters for that SEQUENCE. The additional preselected parameters may include the name of the current step of the SEQUENCE of the process, the time in the current step, the current recipe number, the next recipe number, the number of active shutdown alarms, the number of active emergency alarms, the number of active warning alarms, the number of active alert alarms, the number of active request alarms, the number of active digital and/or analog inputs in manual mode, and the number of digital and/or analog outputs in manual mode.

The operator station of the present invention also preferably includes data input means for selecting one of a set of preselected process primitives, and means for indicating a value for the selected process primitive and substituting the input value for that primitive as the value to be monitored and controlled by the PCC.

OPERATOR STATION TERMINOLOGY

Process SEQUENCES

The process control computers associated with the operator station of the present invention will each typically control a plurality of SEQUENCES which together define a portion or all of a manufacturing process and its control environment. The operator station of the present invention may be assigned one or more SEQUENCES from each of the PCCs associated with that operator station.

Process SECTIONS

A SECTION is a logical collection of SEQUENCES. Unlike SEQUENCES, a SECTION is not necessarily associated with a single PCC. A SECTION is likewise not necessarily associated with a single manufacturing process. A SECTION might include a set of SEQUENCES, each under the supervision of different process control computers (and each possibly relating to different manufacturing processes, but which have similar operational characteristics. For example, a group of similar boilers, each having its own PCC but with similar respective PCC control programs could comprise a SECTION. Thus, identification of a SECTION of SEQUENCES allows for a logical grouping which can efficiently be monitored and controlled by a single operator at the operator station regardless of the physical location, or the physical interrelationship, of the SEQUENCES.

Alternatively, a SECTION may be defined as a subset of SEQUENCES in the same manufacturing process. For example, a SECTION might include a selected SEQUENCE, the previous SEQUENCE, and the successive SEQUENCE in a manufacturing process, thereby allowing the operator to monitor and control a segment of a manufacturing process that is larger than a SEQUENCE. Again, the SEQUENCES in a SECTION, though parts of the same manufacturing process, may all be controlled by a single PCC, or by separate PCCs.

Process Field Units

A "process field unit" as used herein, is a collection of process primitives that describe the characteristics of a physical or datalogical object, such as a process control field device (i.e., pumps or valves) or optionally, a software entity in the PCC such as an analog output controller. Each process field unit (or PFU) has a set of at least one associated process primitive representing at least one associated variable in the PCC, preferably including a primary process primitive and one or more secondary process primitives. Each PFU may be represented by a unique graphical symbol. Thus, display of an icon corresponding to a single PFU is an infological tool which represents a predefined collection of data corresponding to a physical component (a process field device) of the process.

Common Elements

As used herein, "common elements" are objects in the operator station which are associated (in any specific instance) directly or indirectly with one or more data values in the process control system and which are also assigned an icon or symbol so that they can be viewed as graphical symbols (or objects) in an infological context by the human operator; "common elements" have the following characteristics:

They appear in a number of application windows.

They behave in a similar manner whenever they are subjected to an interrupting impulse. The reason for this is that each common element is preferably related to a specific common element class having defined associated data types and manipulation response attributes for all individual manifestations of that common element associated with that particular class. As an example, in the current embodiment of the invention, all common element process primitives represented on the operator station as analog inputs in the PCC will, when represented on the operator station by the process primitive designed for the purpose of depicting analog inputs, always display the same predictable dialog box to the human operator when any given analog input process primitive is "clicked upon" by the human operator.

They are all subject to the same kind of manipulation either by an operator or by the operator station system software.

Broadly, common elements include different classes of process primitives which can represent datalogical variables in the PCC. Additionally, PFUs can be "macro" common elements which are objects having an associated attribute set of other (process primitive) common elements.

As can be appreciated by those skilled in the art of depicting data in the form of information, common elements are useful infological organizing entities for the human because they provide a consistent reference frame for similar patterns of data interrelationships to be presented for rapid study and consideration by the human. As a broad example of a common element, consider a generic textbook having the attributes of a title page, preface, table of contents, a set of numbered chapters of information, and an index. While the information depicted in a history textbook and a mathematics textbook having this "common element" structure will be different, a human student will look in the back of either textbook when she/he needs to study the index. The reason for this is that the reader is culturally conditioned to view textbooks within a "common element" context at a high level and to expect to see certain types of textbook data in certain places (in this case, the reader expects to see the index as the last collection of data in the textbook).

Process primitives depict associated process control computer variables as common elements; some types (or classes) of these process primitives include:

Process Inputs—graphical objects which are associated with PCC data values (including analog inputs and/or digital inputs in the PCC wherein the analog and/or digital inputs are individually associated with field instrumentation used to measure manufacturing apparatus attributes such as temperature, pressure, flow, or valve position;

Process Outputs—graphical objects which are associated with PCC data values (including analog and/or digital outputs in the PCC wherein the analog outputs and digital outputs are individually associated with field instrumentation which directly affects and modifies the manufacturing apparatus in a dynamic sense, since the outputs are delivered to field devices (such as pumps, valves, agitators and mixing devices, such as impellers, which are components in the manufacturing apparatus).

Process Variables—graphical objects which are associated with PCC data values which are not directly associated with field instrumentation but are either periodically changed by either the process control computer or by a human being. In the case where the PCC recomputes the value of the process variable, the frequency of value change will be very high; in the case where the human being changes the process variable, the frequency of change should be very low. Process Variables are differentiated here in terms of being different than Process Inputs and Process Outputs in that they are not PCC data items which are consistently associated with field instrumentation. In the case of the human changeable Process Variable, the term "Process Constant" is used to further distinguish the expected change frequency.

Alarm Variables—graphical objects which are associated with process control computer data values which function to alert humans and set status indicators in the process control computer when specific events occur which require either human attention or an altered process control methodology. Usually, these events are considered to be interruptions in the ideal progression of the manufacturing cycle.

Process primitives can provide an organization or corporation culture with universally recognized symbolic entities. These symbolic entities can be infological standards which minimize training, confusion, and uncertainty while maximizing the likelihood of a consistent response in addressing certain situations relating to the subject matter of these symbols. For example, a standard process primitive could be established for room temperature, with the primitive being displayed in a series of standard colors associated with different predefined temperature ranges. An HVAC support team could then move easily between corporate facilities in performing maintenance functions requiring use of a different operator station interface in each facility.

Process primitives provide the operator station system with an entity which is useful in bridging the challenging datalogical-infological continuum addressed by this invention. As a straightforward specific example, consider a temperature in the manufacturing process which is to be depicted to the human operator. The temperature in the process will be sensed in the field by a temperature sensor (such as a pyrometer, resistance temperature device, or thermocouple), and a voltage or serial data stream will be communicated to the process control computer. In the PCC, the temperature will become a data type known as an Analog Input. The Analog Input will have a set of associated attribute variables (such as a scale factor if a fixed point data format is defined or a decimal position if a floating point data format is defined). The Analog Input in the digital computer is a series of zeros and ones (i.e., 0001 1111) which is difficult for the human operator to study in an infological context, and will only have infological value to the human in the operator station if it is presented in human recognizable form. Human recognizable forms of this data might be as a series of Arabic numerals (i.e., 31) or perhaps as a bar chart (unless the human is highly specialized in reading binary numbers). The bar chart depiction of the analog variable could be considered to be one type of Analog Input Process primitive, and the Arabic numeral could be considered to be another type of Analog Input process primitive. If we further wished for all Analog Input process primitives to show the value of their data in red Arabic numerals, we will have made the first step in creating a "common element" for Analog Inputs since humans will become conditioned to viewing red Arabic numerals as Analog Inputs. If we then create a common element which depicts all Analog Inputs so referenced with both a red Arabic numeral of a certain size and a bar chart having its lower right corner positioned 5 pixels to the left of the leftmost Arabic numeral, we begin to create a "process field unit" or PFU "macro common element" for the Analog Input which is comprised of two or more process primitive "common elements". The continuum of physical-datalogical-infological abstract is then managed by the "field sensor and transmitter"-"Analog Input"-"Analog Input process primitive 'common element'"-"PFU 'macro common element'" entities wherein the last two "common elements" help to address the infological need of the human at two different levels of sophistication.

It will be appreciated by those skilled in the art that other infological or datalogical objects may be defined as common elements, where those objects have the above-described characteristics, and where it is useful to the operator to have the capability of quick access for monitoring and/or changing variables associated with the objects through the operator station interface.

WINDOWS

The operator station of the present invention utilizes a conventional windows operating environment. Each window typically includes a window frame, which is the outer border of the window. Window frames typically include a title bar and one or more button icons. The window frame and the button icons allow access to a window menu and several alternative methods which allow the operator to change the placement, size and shape of some of the operator station windows.

As used herein, a "dialog box" is a window which allows data entry and option selection effecting the display or management of information and items in the operator station's domain. Dialog boxes typically appear on the display as a result of the operator's selection of an item or operator station variable in the manner hereinafter described.

"Pull-down menus" are windows including lists of items. Pull-down menus are invoked when a displayed menu heading is selected. An option listed in the pull-down menu can then be selected by dragging the mouse cursor down the list of options and clicking on the option.

"Pop-up menus" are windows including lists which appear on the display when a specific graphic icon or an area of an icon is selected. For example, clicking on a common element anywhere that the element appears in the operator station display will invoke a common element pop-up menu.

A "cascade menu" is a pop-up or pull-down menu which is invoked from selecting another menu option. In the parent menu, available cascade menus are preferably indicated by a right pointing triangle next to the menu option that cascades. A window menu is a list which is accessible by clicking on the hyphen-like icon in the upper left corner of a window frame. The window menu typically provides a plurality of conventional window manipulation options.

A conventional data input device, such as a mouse or a track ball, is typically used to manipulate the windows on the operator station displays, as well as select items from menus. It will be appreciated by those skilled in the art that any conventional data input device may be utilized in the present invention and, when used hereafter, "mouse" shall be understood to identify not only the conventional mouse device, but other known alternatives, such as trackballs, tablets, and light pens.

As used herein, "click" or "clicking" means the operation of pressing and quickly releasing one of the mouse buttons. Items displayed in an operator station window are typically selected by positioning the mouse pointer on the item and "clicking on" that item.

As used herein, "dragging" refers to the technique of positioning the mouse pointer over an item and holding the mouse button down while moving the mouse. When an item is dragged to the desired position on the display, the mouse button is released to finalize the position change.

Operator Station Application Windows

In the present invention, there are selected specific application windows that are presented upon startup of the operator station. In the preferred embodiment, these windows are always present and cannot be removed, reduced in size, or iconized.

The following standard application windows are preferably located on the primary display:

the SECTIONS Overview Window;

the SEQUENCES Overview Window;

the Plant Overview Flowsheet Window; and the Flowsheet-Dependent Trend Window.

The following standard application windows are preferably located on the secondary display:

the Main Menu; and the Unacknowledged Alarm Overview Window.

SECTIONS Overview Window

The SECTIONS Overview Window contains a SECTION Indicator for each of the SECTIONS to which the Operator has control (data write) access. Each SECTION Indicator contains a Critical Success Factor (CSF) indicator and additional graphic objects that tell the operator about the state of the SECTION. In addition to providing the operator with an overview of all SECTIONS for which he has responsibility, the SECTIONS Overview Window provides Flowsheet/SEQUENCE navigation—if the operator clicks on the SECTION name in a SECTION Indicator, the SEQUENCES Overview Window is updated to display all of the SEQUENCES associated with the SECTION. Clicking on the SEQUENCE Button also causes the SECTION Indicators for any SECTIONS related to any of the currently displayed SEQUENCES to be highlighted, thus indicating that the SEQUENCES Overview Window reflects the SEQUENCES of this SECTION.

In addition to SECTION Indicators, the SECTIONS Overview Window also contains related PCC Indicators, each of which contains a PCC status box. The PCC Indicator may optionally include additional status boxes associated with other PCC-related entities and, in the preferred embodiment, a process control communication system status box is provided. In addition to displaying status information, the PCC Indicators provide a mechanism for the operator to access certain PCC functions. Clicking on the PCC Indicator displays a menu that allows the operator to set the source of data (where, for example, the PCC is a redundant system) and the data acquisition path (again, for example, where a redundant communication network is utilized). This menu also enables the operator to initiate the process which will change the value of any process variable in the PCC for which the PCC and the process control communications system permit change. In this regard, in the preferred embodiment of the invention's use, the PCC has two classes of variables: those to which change of value is permitted through the process control communications system, and those to which change of value is not permitted through the process control communications system. However, the process control communications system interfacing the PCC with the operator station recognizes three classes of variables which it will consider with respect to evaluation of messages which are being forwarded from the operator station to the process control computer: (1) those to which change of value is permitted through the process control communications system, (2) those to which change of value is permitted through the process control communications system only when the human operator has been forced to proceed through a secondary security-related process when the individual value change is being attempted, and (3) those to which change of value is not permitted through the process control communications system (which could be a different set than that accorded the same status by the PCC).

As used herein, the two types of latter "data value writes to the PCC which have been initiated from the operator station by a human being" operations will be identified as follows:

Operations to modify variables to which change of value is permitted through the process control communications system where the human operator is not forced to proceed through a security-related process when the individual value change is being attempted will be referenced as "Manual Data Writes" since they represent data write operations to the PCC database which are manually initiated by a human being from the operator station;

Operations to modify variables to which change of value is permitted through the process control communications system only when the human operator has been forced to proceed through a security-related process at the time when the individual value change is being attempted will be referenced as "Bypass Manual Data Writes" since they represent data write operations to the PCC database which are manually initiated by a human being from the operator station wherein the incoming message to the process control communications system must bypass the normal security filter applied by the process control communications system to incoming messages directed to modification of variables in the process control computer. The ability for an individual message to bypass the filter is derived from a change in the message content and data structure as a result of the human operator proceeding through the security-related process at the time that the change of value message is being formulated in the operator station. In the preferred embodiment, a Bypass Manual Data Write is implemented in three steps. First, the operator opens a Dialog Box for the selected variable and enters its new value. Second, the operator opens a security Dialog Box by clicking on the PCC indicator for the PCC with which the selected variable is associated and inputs the appropriate security code. Third, the operator must then click on the send button in the change Dialog Box within a pre-determined time period. If the operator does not complete this third step within the pre-determined time period, the security code is rendered invalid for this operation and must be re-entered. The time period related to the security code is restarted after each successful Bypass Manual Data Write, thereby enabling the operator to perform a series of associated Bypass Manual Data Writes for one security code entry.

SEQUENCES Overview Window

The SEQUENCES Overview Window displays a SEQUENCE Indicator for each of the SEQUENCES in the currently selected SECTION. Like the SECTION Indicator, the SEQUENCE Indicator displays a summary of the state of the SEQUENCE through graphic objects, including a CSF indicator. It should be noted that a CSF indicator associated with a SEQUENCE may have a different set of associated rules and/or data schema for determining its value. Clicking on the Flowsheet Button of a SEQUENCE Indicator causes the Master Flowsheet for that SEQUENCE to be displayed within the Plant Overview Flowsheet Window. The SEQUENCE Indicator is highlighted to indicate that the indicated SEQUENCE is related to the currently displayed flowsheet.

Clicking on the SEQUENCE Indicator outside the flowsheet button allows the operator to access the common element pop-up menu. This menu is explained hereafter in further detail and provides access to SEQUENCE interaction functions and other common functions, such as Expanded Glossary.

Plant Overview Flowsheet Window

A "graphic sheet" is a generic reference to any "sheet" or "drawing" or "artfully constructed pictorial" which is depicted in a window of the operator station at a given time to communicate to the human regarding the status of the process. One type of graphic sheet, called a flowsheet or process flowsheet, pictorially depicts a portion of the manufacturing process being controlled with a block flow diagram showing the manufacturing components connected in a logical relationship which illustrates the progressive movement of the material flow within the associated manufacturing process.

Thus, while the term flowsheet is often used in this specification, it will be appreciated by those skilled in the art that any collection of graphic symbols relating to a portion of the process may be aggregated to define a graphic sheet which might be displayed in the Plant Overview Flowsheet Window.

The graphics interpret PCC data communicated to the operator station by the PCC, or by a separate process control communication system associated with each PCC. The operator interacts with the Flowsheet application by clicking on objects on the process flowsheet (or other graphic sheet). In response, this action activates the display of the common element pop-up menu and provides access to Change, Expanded Glossary, and other common functions. The unobscured portion of the flowsheet continues to be updated while the menus and/or dialog boxes are displayed.

A flowsheet may contain icons that allow for navigation to additional flowsheets. A flowsheet queue is maintained to allow the operator to redisplay recently accessed flowsheets.

The Plant Overview Flowsheet Window is a special window that interacts with the SEQUENCES Overview and SECTIONS Overview applications. Clicking on the Overview Button in a SEQUENCE or SECTION Window results in the display in the Plant Overview Flowsheet Window of the Master Flowsheet associated with that particular SECTION or SEQUENCE. In addition, if the operator selects a new flowsheet for this window using the mechanisms provided by the Flowsheet application, the SEQUENCES Overview and SECTIONS Overview Windows will be updated to highlight the related SECTION and SEQUENCE(s).

There is preferably only one Plant Overview Flowsheet Window, but additional Flowsheet Windows (which do not necessarily interact with the SECTIONS and SEQUENCES Overview applications) can be accessed and viewed through the Flowsheet option in the Main Menu.

Trend Windows

The trend windows are graphic sheet display graphs similar to "strip charts" that show the present and historical values of a selected group of process variables. Each group is updated with process data obtained via the PCCs in real-time at selected time periods corresponding to an integer multiple of the PCC real-time period. It should be noted that the integer multiple defining the update period is set to provide sufficient granularity in the currency of the information while at the same time minimizing the use of the processing resources devoted to this task. For example, with a PCC real-time period of one second, the historical period might be 60 seconds. In a preferred embodiment, a trend window can contain up to four individual line graphs, each of which contains up to six variables. There are two types of trend windows: Flowsheet-Dependent Trend Windows, and Flowsheet-Independent Trend Windows.

The Flowsheet-Dependent Trend Window is one of the Plant Overview Windows. Every flowsheet preferably has a related trend definition. When the operator selects a flowsheet for display in the Plant Overview Flowsheet Window, the Flowsheet-Dependent Trend Window is automatically updated to display the trend associated with that flowsheet. There is preferably only one Flowsheet-Dependent Trend Window per operator station.

Flowsheet-Independent Trend Windows are created via the trend option of the Main Menu. As with additional flowsheets, Flowsheet-Independent Trend Windows do not necessarily interact with the Flowsheet application.

In both types of trend windows, the operator can add variables for display, delete variables, and perform other "trend maintenance" functions. When a trend is initially displayed, the operator system software will obtain process history data (preferably obtained from a "history server", which is a separate database serving as a common source of time-correlated (historical) process data for all the operator stations (and other systems related to the PCC which are outside the scope of the present invention in a plant network)) and use the historical data to initially populate the trend graph. If no historical data is available for a specific variable, the variable will be real-time trended only.

Alarm Windows

An Unacknowledged Alarm Overview Window is also preferably presented upon startup of the operator station on the secondary display. As with the other standard application windows, the Unacknowledged Alarm Overview Window is fixed in size and location. This window displays all active but unacknowledged alarms for the process control computers associated with the operator station. Like the Plant Overview Windows, the Unacknowledged Alarm Overview Window cannot be moved, iconized, or closed. However, in one embodiment, this window can be covered by another window if there are no unacknowledged alarms present.

All alarms that are active (whether or not acknowledged) appear in the Active Alarms Window. (The operator has the ability to select optional display filtering criteria for the Active Alarms Window.) The operator can click on an alarm to access the common element pop-up menu, providing access to Alarm Acknowledgement, Expanded Glossary, and the other common functions relevant to an alarm as a variable. Together, the Unacknowledged Alarm Overview Window and Active Alarms Window contain a list of all active alarms from the SEQUENCES in SECTIONS assigned to that operator station.

In addition to these windows, in the preferred embodiment, the operator can create additional Alarm/Manual/Event (AME) Windows from the Main Menu. As with the Active Alarms Window, these additional windows have a variety of options for alarm/event display selection, filtering and sorting. These additional windows allow the operator to perform functions such as:

Real-time monitoring of selected alarms, grouped in a logical order in a grid on a graphic sheet (in the Alarm Grid Flowsheet Window);

Real-time monitoring of one or more alternative sets of active alarms in a manner similar to that of the Active Alarms Window discussed above, but filtered and sorted in a different context;

Real-time monitoring of items under manual control (in the "Elements-In-Manual Window");

Real-time monitoring of categories of system event messages received from one or more PCCs (in the Real-Time Event Capture Window). As used herein, system event messages are unsolicited data or status messages received by the operator station from other components of the manufacturing process control system, such as a PCC or a process control communication system (both as hereinafter defined); and Reviewing the operator station's event log of PCC system messages over a given time period, based on specified filtering criteria (in the Event Browser Window).

Additional Diagnostic Windows may also be provided. Diagnostic Windows provide selected diagnostic information relating to a particular selected common element. As with AME Windows, Diagnostic Windows have a variety of options for filtering, sorting, and interpreting the diagnostic information presented with the associated common element.

The Main Menu Window

A Main Menu is also presented upon startup, and preferably remains in a fixed location and size on the operator station's secondary display. This Main Menu contains a list of operator commands which allow the operator to create additional flowsheet windows, trend windows, event log browser windows, or to access common elements and other operator-station-supported functions.

Process Status Indicators

SECTION Indicators and SEQUENCE Indicators both preferably contain an object called a Critical Success Factor (CSF). The goal of the CSF object is to provide the operator with an overall view of the status of a SECTION or SEQUENCE while consolidating the information for the operator in an abstracted indicator, and, at the same time, providing the operator with improved and more focused information to assist him/her in fulfilling his/her tasks. The effectiveness of the CSF object for a SEQUENCE or SECTION in reaching this goal is dependent on the definition of the CSF calculation, which is defined by the process control engineer using definition utilities provided by the system.

The CSF object may consist of two components:

A pie-chart that indicates the actual value; and

A rotating line segment that indicates the trailing average of the CSF value.

The CSF calculation should be defined by the process control engineer in such a manner that it preferably produces a value within a predefined range. In a preferred embodiment, a range of 0 to 1.0 is utilized, with zero indicating that the plant is operating under ideal circumstances, and one indicating a plant upset condition. However, an alternative range of values could be defined for the CSF to indicate plant conditions. For example, a range including negative values may be established, with the more negative values indicating increasingly undesirable plant operating conditions, a zero value indicating an ideal operation, and increasingly positive or negative CSF values indicating operation further from the ideal circumstances.

If the CSF absolute value increases, the size of the shaded portion of the pie-chart increases (a value of 1.0 or greater will fill the entire circle). In the preferred embodiment, the shaded pie section always originates at the top of the circle, and encompasses an arc of (360 * CSF value) degrees, rotated counter-clockwise from the top of the circle. When a CSF value includes a negative range, a negative CSF value may be indicated by various means, such as by sweeping an arc from the top of the circle in the clockwise direction, or by color-coding the shaded portion of the pie chart one color for a positive CSF value and another color for a negative CSF value.

The CSF trailing average value is preferably calculated by the OS software using the following equation:

$$CSF\_trailing = CSF\_trailing + weighting\_factor * (current\_CSF\_value - CSF\_trailing)$$

By appropriately adjusting the weighting factor, the process control engineer can vary the speed at which the trailing average indicator responds to changes in the CSF value. The trailing average indicator is rotated (360 * trailing average CSF value) degrees counter-clockwise from the top of the circle.

As will be appreciated by those skilled in the art, the CSF object may consist of any shape which can be effectively subdivided to provide an abstract indication of the status of that portion of the process represented by the CSF. Similarly, when utilized, the rotating line segment could be replaced with a sliding segment, pointer or other marker indicating the trailing average (or other desired statistical marker) and rate of change of the CSF value without departing from the spirit of the invention.

Another process status indicator is the status box. A status box may be associated with a SECTION, a SEQUENCE, a PCC, or a PFU or other common element including process primitives, such as variables or alarms. The status box is preferably a square subdivided into four quadrants. The status of the SECTION, SEQUENCE, PCC, PFU or other common element associated with a particular status box is indicated by shading or coloring of one or more of the four quadrants in the box according to a predefined standard. The predefined standard appearance for each status which might be indicated by the status boxes is preferably the same whether the status box is associated with a SECTION, SEQUENCE, PCC, or PFU or other common element. In this way, the operator has a limited set of visual queues associated with a limited range of statuses regardless of the entity represented by the particular status box.

BRIEF DESCRIPTION OF THE DRAWINGS

FIG. 10 is a navigation marker;

FIG. 11 is a process control computer indicator;

FIG. 12 is a typical display of a SEQUENCES Overview Window;

FIG. 13 is a SEQUENCE indicator in normal mode;

FIG. 17 is a typical Flowsheet Window;

FIG. 18 is a flowsheet name Dialog Box;

FIG. 19 is a "Select Flowsheet" Dialog Box;

Figure 28:
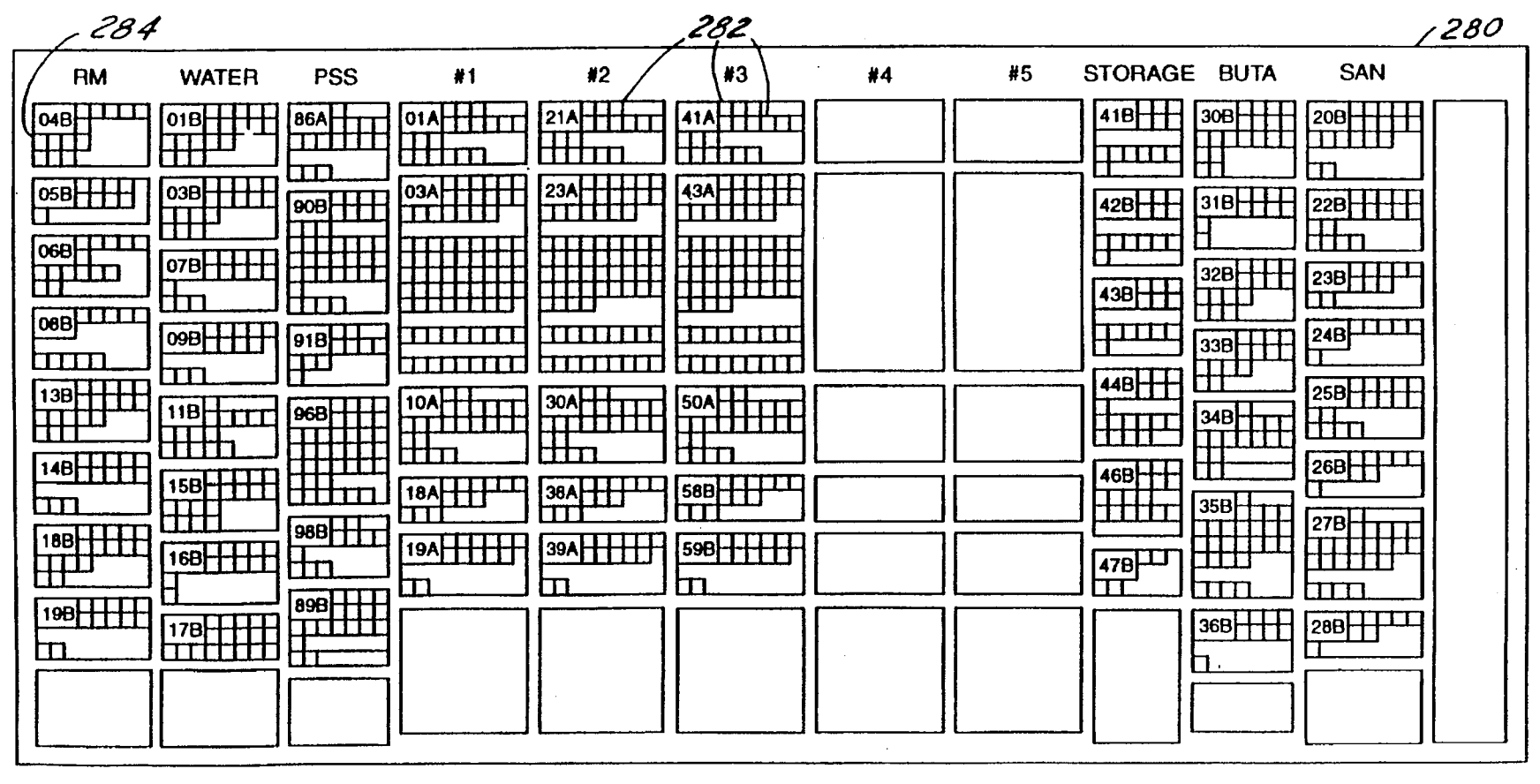

FIG. 28 is a typical Alarm Grid Flowsheet Window;

These and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
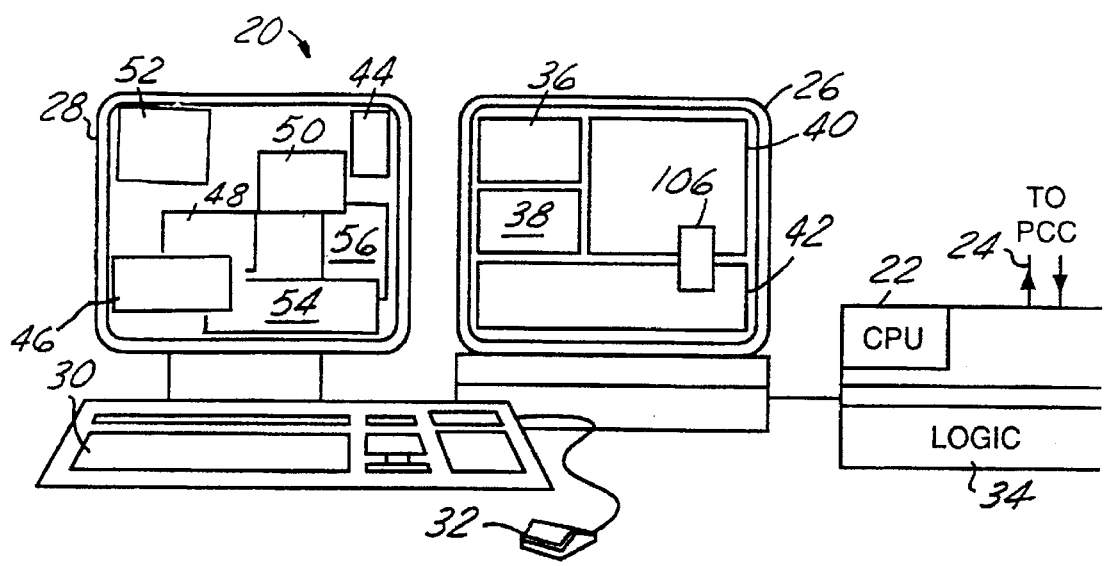
FIG. 1 is a schematic representation of the operator station of the present invention.

Referring to FIG. 1, the operator station of the present invention, generally referred to at 20, includes a central processor (shown schematically at 22), communication means 24 for communication of process data between the operator station and one or more process control computers monitored and controlled through the operator station 20 interface, display means in the form of a primary display 26 and a secondary display 28, data input means, such as a keyboard 30 and a cursor positioner (shown as a mouse) 32, and logic 34 for displaying information corresponding to the process being monitored by the operator station.

The primary display 26 includes a SECTIONS Overview Window 36 including information relating to at least one of the SECTIONS monitored by the operator station 20. The primary display also includes a SEQUENCE Overview Window 38 including information relating to one or more SEQUENCES monitored by the operator station 20, a Flowsheet Display Window 40 including a graphic sheet, such as a flowsheet, of a selected portion of the process with the current values in the PCC depicted with selected associated process primitives, and a trend display window 42 including current and historical information in graphic form for selected PCC variables.

The secondary display 28 includes the Main Menu 44 including a display of selected commands which provide access to optional operator station windows, common elements, an on-line help window, a screen print function, and user-configurable set-up options. The operator station 20 also includes an Unacknowledged Alarms Overview Window 46, preferably located on the secondary display 28. This window 46 preferably presents an overview displaying all unacknowledged alarm variables for SEQUENCES monitored by the operator station 20. The secondary display 28 also preferably includes an Active Alarm Window 48 which displays a list of all the active alarms (both acknowledged and unacknowledged) generated from the SEQUENCES by the PCCs in the operator station. The secondary display 28 may also include displays 50, 52, 54 and 56 of other selected support applications, such as other windows including information relating to additional flowsheet windows, alarms, events, PCC variables in manual mode, and additional trend windows.

In the preferred embodiment, the computer hardware portions of the operator station 20 of the present invention comprise a model VAX4000/60 microcomputer with at least 72 megabytes of RAM, at least a 1 gigabyte hard disk drive for data storage, an extended keyboard, two 19" VGA color monitors, and a three-button mouse, all available from Digital Equipment Corporation of Cambridge, Mass. It will be appreciated by those skilled in the art that other commercially available computer hardware systems may be utilized in the operator station 20 of the present invention without departing from the spirit of the invention. It will also be appreciated by those skilled in the art that other cursor positioner devices, such as track-balls, tablets, or touch-sensitive screens, may be employed in place of the three-button mouse 32.

Figure 2:
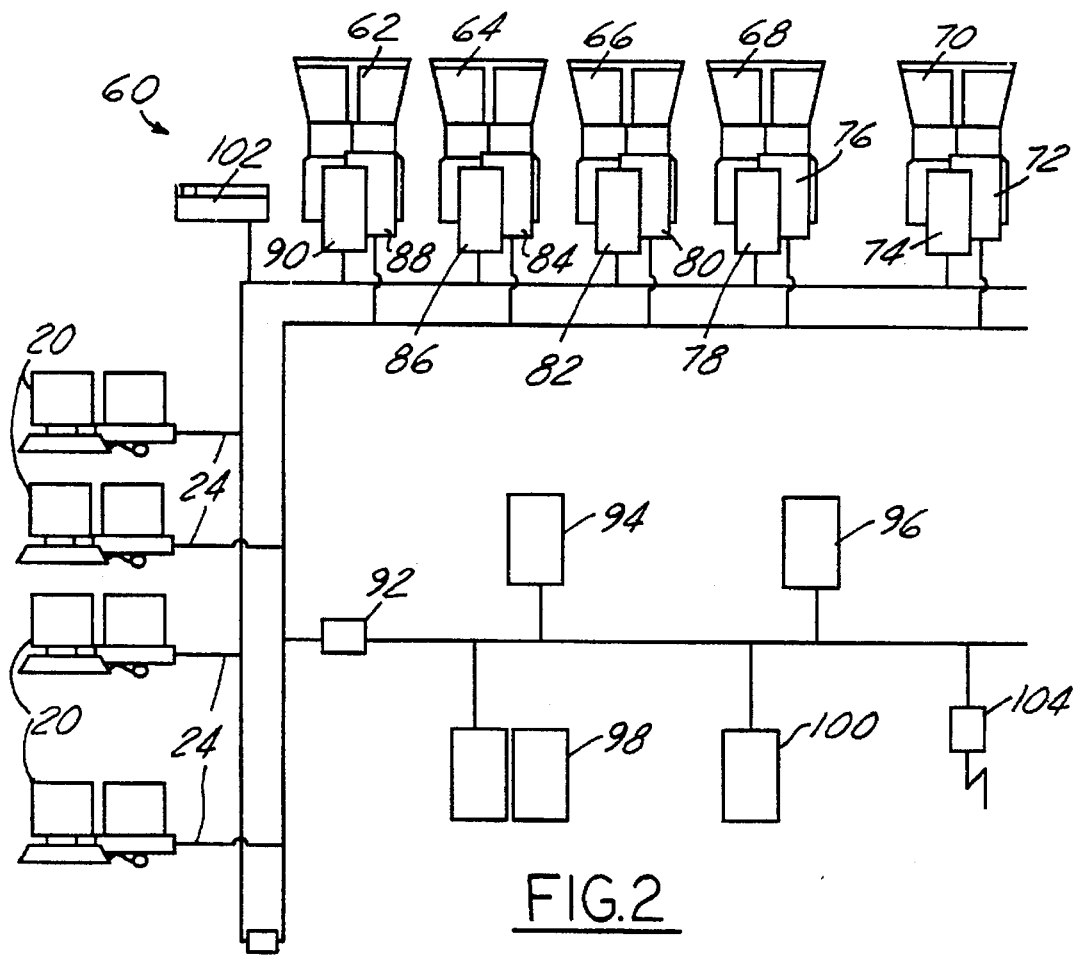
FIG. 2 is a schematic of a process control environment utilizing the operator station of the present invention.

Referring to FIG. 2, the operator station 20 of the present invention is typically utilized in a manufacturing process control system 60 including one or more dedicated process control computers (PCCs) 62–70 each of which PCCs 62–70 controls one or more SEQUENCES in a manufacturing process. The operator station 20 is connected to each of the PCCs 62–70 for two-way communication of process data. FIG. 2 illustrates a large plant area network (PAN) which, in addition to one or more operator stations 20, and the process control computers 62–70, includes other computer systems which provide various information, or otherwise support the manufacturing process control system 60. For example, a large PAN might also include one or more process control communication systems 72–90 dedicated to communicating process information from the process control computers 62–70 to other systems on the PAN such as operator station 20 of the present invention. One type of a process control communication system which might be employed in the PAN including the operator station 20 of the present invention is the intelligent front-end communication system disclosed in U.S. patent application Ser. Nos. 898,923, 898,126, and 897,905, each filed on Jun. 12, 1992. Ser. No. 898,923 is entitled "Secure Front-End Communication System and Method for Process Control Computers". Ser. No. 898,126 is entitled "Intelligent Process Control Communication System And Method". Ser. No. 897,905 is entitled "Stealth Interface For Process Control Computers". These applications describe in detail various aspects of a front-end communication system which is interposed between a plurality of actively redundant PCCs and a computer network. These applications are hereby incorporated by reference.

The PCCs 62–70 typically employ two separate and independent process control computers which each simultaneously monitor the same inputs from the manufacturing process. The dual PCCs 62–70 each likewise continually update separate, identical sets of process variables and, independently attempt to perform various control functions responsive to the inputs monitored. Such control functions include calculating and modifying selected process variables internal to the PCC and/or generating signals which may be transmitted to physical components of the manufacturing process to, for example, open a valve, or fire the burners under a boiler. The redundancy of this dual process control architecture provides a failsafe control environment in which the redundant systems' statuses can be constantly compared to insure the viability and accuracy of the process digital and analog inputs and derived internal process control data variables.

The ultimate manufacturing process control functions can be effectuated through any of a variety of well-known arbitration schemes. One such arbitration scheme may be found in U.S. patent application Ser. No. 925,089 filed on Aug. 4, 1992, entitled "Method Of Input Signal Resolution For Actively Redundant Process Control Computers." This application describes in detail the communication and control links between a pair of actively redundant process control computers such as are typically employed in each of PCCs 62–70. This application is hereby incorporated by reference. A second arbitration scheme may be found in U.S. patent application Ser. No. 864,931, filed on Mar. 31, 1992, entitled "Process Control Interface System Having Triply Redundant Remote Field Units." This application is also hereby incorporated by reference.

As will be appreciated by those skilled in the art, other further redundancies (such as three or more independent process control computers or a redundant communication network) may be incorporated into the manufacturing process control system to ensure continuous accuracy and viability of the system.

In the preferred embodiment, the operator station 20 is interconnected to the PCC indirectly through the process control communication systems 72–90 via one or more commercially available networks. The communication means connecting the operator stations 20 of the present invention to the Ethernet preferably uses Ethernet hardware and DECnet protocols, as well as Ethernet hardware and proprietary Ethernet protocols to the process control communication systems 72–90.

The manufacturing process control system 60 might also include separate support systems connected to the network via a bridge 92 such as a control room data manager (CRDM) 94 which insures that the other systems on the PAN (including the operator station 20) have the correct and up-to-date copies of all required program and/or data files associated with the manufacturing process, process information (PI) systems 96 which perform a number of functions, including retrieval of process data and updating a process data history database. A large PAN might also include a separate history server 98 as part of the PI system which provides historical process data to the operator station 20. The PI system may also include, either physically integral with the PI system 96, or as a separate system, a process control software support system 100 which maintains the software needed to develop additional process control programs which might be implemented by the PCCs 62–70 in the PAN.

Another separate system which might be a part of the PAN is the security manager 102. The security manager 102 is responsible for maintaining the security of the PAN. The security manager 102 would typically provide the operator station 20 with a list of the systems on the PAN to which the operator station 20 is allowed to communicate.

As will be appreciated by those skilled in the art, there may be other types of systems on the PAN, including expert systems which, may or may not be accessed by the operator station 20 of the present invention. Similarly, the network interconnecting the operator station 20 with any process control computers 62–70 supervised by the operator station may itself be connected to a plant-wide, or company-wide, network via bridge 104 for further plant-wide or company-wide, respectively, communication of selected information from the manufacturing process control system 60.

It will be appreciate by those skilled in the art that the operator station 20 of the present invention is a vital component in a large, automated manufacturing process where real-time supervision and, where necessary, immediate intervention in the manufacturing process is required. The operator station 20 of the present invention must, therefore, provide an operator with quick access to information relating to the status of the one or more SECTIONS and SEQUENCES of the process being monitored by that operator. When, as with the operator station 20 of the present invention, the manufacturing process includes a plurality of PCCs in a PAN, the operator station 20 must communicate massive amounts of processed data in a simple, recognizable format, and provide commands which the operator can quickly implement to receive further information where required.

Figure 3:
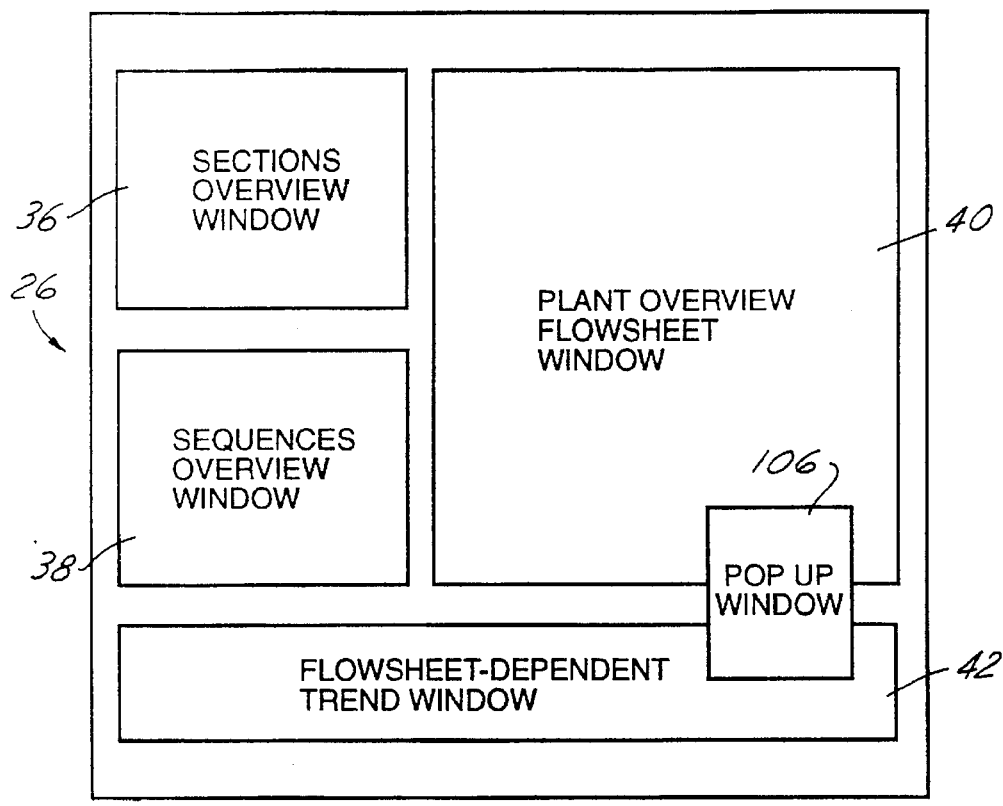
FIG. 3 is a schematic of the primary display including the standard application windows and common element pop-up menu.

Referring to FIG. 3, the operator station 20 of the present invention preferably includes a primary display 26 which presents specific information windows upon startup of the operator station 20. These information windows, collectively referred to as Plant Overview Windows, provide the operator with an overview of the manufacturing process. Plant Overview Windows include a SECTIONS Overview Window 36, a SEQUENCES Overview Window 38, a Plant Overview Flowsheet Window 40, and a Flowsheet-Dependent Trend Window 42. While the information displayed within each of the windows may be changed by the systems or by the operator's command, in the preferred embodiment these windows are always present in a fixed size and location on the screen, and cannot be closed, iconized, or otherwise altered in size or location. Also, any time the operator causes a pop-up window 106 to appear superimposed on the display over one of the Plant Overview Windows, the menu remains on the screen only for so long as the cursor remains within the pop-up menu, or until a predefined time has lapsed, thereby minimizing obfuscation of the information displayed in any of these windows.

It will be appreciated by those skilled in the art that the Plant Overview Windows 36, 38, 40 and 42 provide the operator basic information relating to the SECTIONS and SEQUENCES supervised by the operator station 20 in a fixed, familiar format. At a glance, an operator can survey an overview of all of the SECTIONS supervised through the operator station 20, a subset of the SEQUENCES related to at least one SECTION, summary information relating to unacknowledged and active alarms (in the Unacknowledged Alarm Overview Window 46 and Active Alarms Window 48, respectively), as well as detailed information relating to a specific SEQUENCE (or portion thereof) via the Plant Overview Flowsheet Window 40 and historical information for related variables in the Flowsheet-Dependent Trend Window 42.

Figure 4:
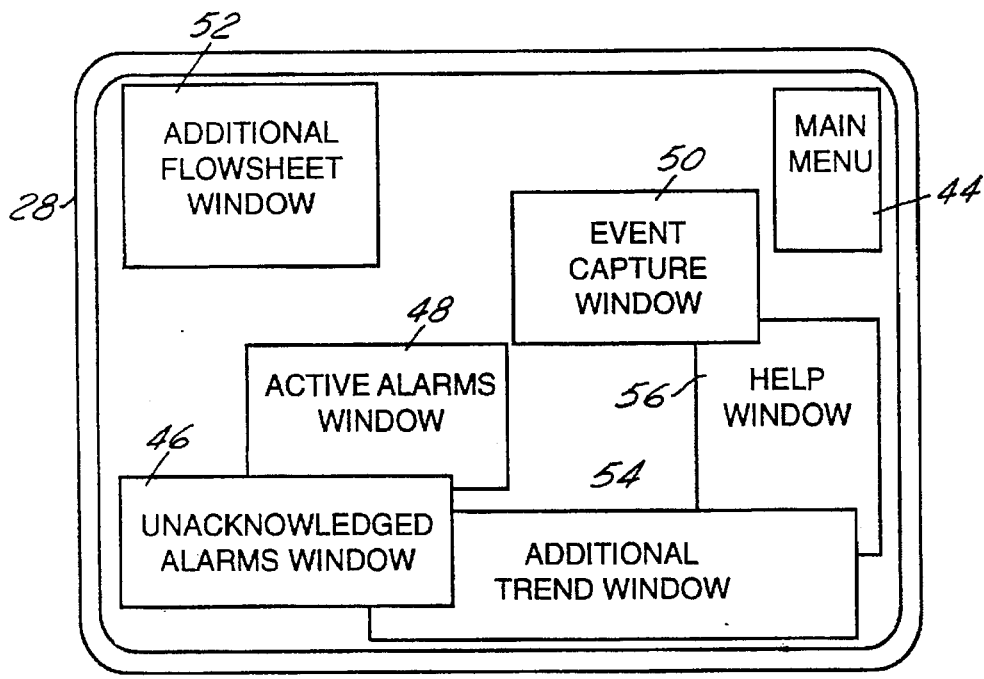
FIG. 4 is a schematic of the secondary display including standard and optional application windows.

Referring to FIG. 4, the operator station 20 also preferably includes a Main Menu Window 44. The system also preferably includes an Unacknowledged Alarm Overview Window 46 (shown in greater detail in FIG. 25 and further described hereinafter) which appears at startup on the secondary display 28. As with the other Plant Overview Windows, each of the Main Menu 44 and Unacknowledged Alarm Overview Window 46 preferably has a fixed size and position (on the secondary display 28), and cannot be iconized or closed.

It should be noted that the fixed location in the preferred embodiment of the SECTION Overview Window 36, the SEQUENCE Overview Window 38, and the Main Menu Window 44 places these windows at the center of the field of view defined by the primary display 26 and secondary display 28. Placing these relatively important windows at the center of field of view minimizes the eye movement of the operator for these frequently viewed windows. In addition, the central location of the frequently used windows also minimizes mouse movement. It should also be noted that, in the preferred embodiment, the display is generated on each of the primary display 26 and secondary display 28 and represent a single graphical field of view. Thus, for example, the operator can move the mouse pointer from a position on the primary display 26 to a position on the secondary display 28 by merely sliding the mouse pointer in the appropriate direction, as if the windows displayed in each of these two displays were one display.

The secondary display 28 also preferably includes an Active Alarms Window 48 which displays a list of all of the active alarms (an alarm whose value is "TRUE" and can be either acknowledged or unacknowledged) generated by the PCCs and monitored by the operator station 20. The Primary Active Alarms Window 48 can be moved, re-sized, obscured, and iconized, but cannot be closed. Other secondary active alarm windows may be opened from the Main Menu. These secondary active alarm windows may also be closed. While other applications and information may be provided, either automatically or at the operator's request, at other locations on the secondary display 28, utilization of fixed display locations for the Plant Overview Windows on the primary display 26, as well as the Main Menu 44 and Unacknowledged Alarm Window 46 on the secondary display 28, provides for familiarity, consistency, and reliability in utilization of operator stations by operators who are otherwise deluged with process control information which must be quickly analyzed in real-time to effectively supervise and control the manufacturing process. It will be appreciated by those skilled in the art that standardization of the size and location of the Plant Overview Windows on the operator station displays 26 and 28 provides an operator with familiarity in the event he is called upon to supervise a different manufacturing process, or different SECTIONS and SEQUENCES of the same process, utilizing the same operator station 20.

The Unacknowledged Alarm Overview Window 46 and other alarms windows will be described in further detail hereinafter along with other Alarm/Manual/Event/ Diagnostics capabilities and information provided by the system.

As will also be appreciated by those skilled in the art, and as is further hereinafter described, the standardization of the graphical and numerical information displayed in the Plant Overview Windows also maximizes the amount of information recognized and assimilated by the operator during his/her survey of the displays 26, 28.

Referring again to FIG. 4, the Main Menu 44 provides access to all the applications of the operator station 20. As with the windows on the primary display 26, the Main Menu 44 appears at startup, and cannot be moved, re-sized, iconized, or closed. The Main Menu Window 44 contains a menu of push button commands, referred to as Main Menu Options, which may be invoked by clicking on the appropriate push button. The Main Menu Window 44 preferably includes the following options:

"Select" provides indirect access to applications that act upon a common element via the common element pop-up menu (as described further hereinafter). By clicking on the Select push button, a dialog box is displayed which prompts the operator to identify a common element, and which, once approved by the operator, provides a list of options, such as Change, Glossary, or Expanded Glossary, whose functions can then be selectively implemented with respect to a specific instance of the selected common element.

"Flowsheet" provides the ability to create additional flowsheet windows 52 on the secondary display 28, as hereinafter described in further detail. When an additional flowsheet window is created, the display in the new flowsheet window defaults to the graphic sheet currently displayed in Plant Overview Flowsheet Window 40. However, the operator can specify display of a different flowsheet and can create more than one additional flowsheet window on the secondary display 28 using this command.

"Trend" provides the ability to create flowsheet-independent trend windows 54 on the secondary display 28 as hereinafter further described in greater detail. As with Flowsheet, the operator can create more than one flowsheet-independent trend window 54 on the secondary display 28 using this command.

"Help" provides a window 56 including general information about each of the major applications, including the SECTIONS Overview Window 36, the SEQUENCES Overview Window 38, the Plant Overview Flowsheet Window 40, and the Flowsheet-Dependent Trend Window 42, as well as information on how to obtain more detailed information about other aspects of the operator station 20.

"Print" provides options for capturing and printing the current screens on either the primary display 26 or the secondary display 28.

"Alarm" provides a cascaded menu which in turn provides access to all the optional alarm, elements-in-manual, event display, and assisting glossary windows (as hereinafter described).

"Set-up" provides a cascaded menu of utilities useful in defining the operating parameters of the operator station 20.

An additional alternative function in the main menu 44 includes a push button command which can reset all displays in the operator station 20 to a default display set.

Figure 5:
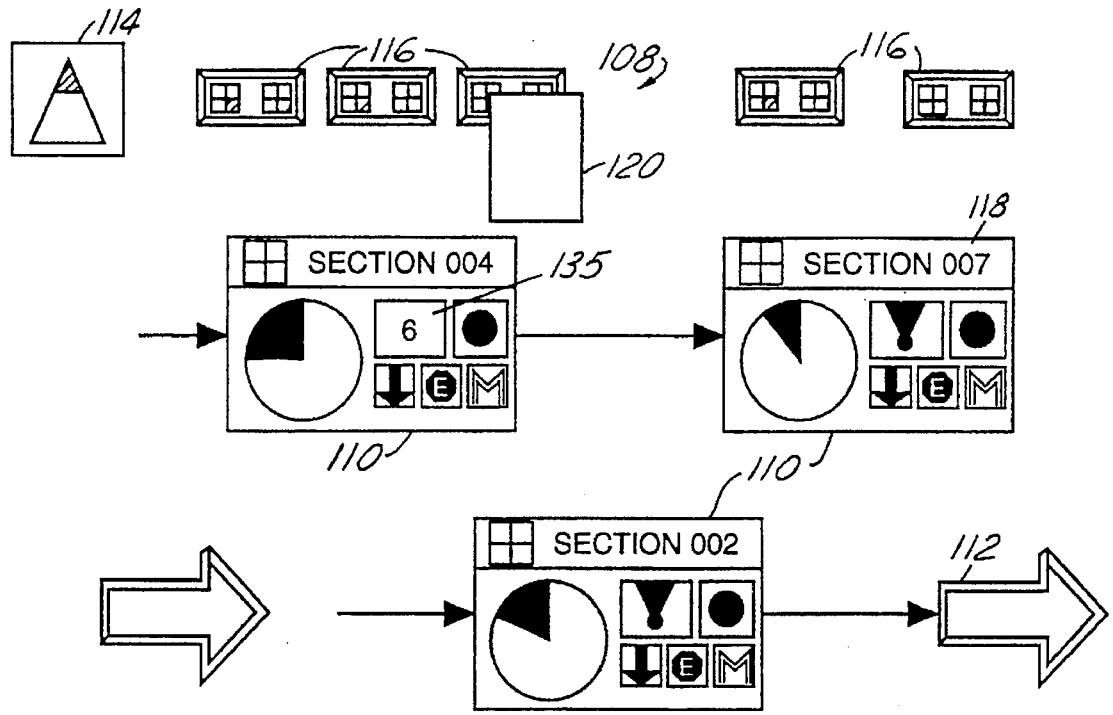
FIG. 5 is a typical display of a SECTIONS Overview Window.

Referring now to FIG. 5, the SECTIONS Overview Window 36 preferably includes a permanent display of a graphic sheet including symbolic representation of all of the SECTIONS in the plant that are assigned to this operator station 20. It should be noted that there are preferably no scroll bars provided for this window. The entire graphic sheet is always visible in the SECTION Overviews Window 36. The various icons in the SECTIONS Overview Graphic Sheet 108 include SECTION indicators 110, SECTION navigation markers 112, 114 and PCC indicators 116.

The SECTION indicator 110 is a symbolic representation of a SECTION. In the example SECTIONS Overview Graphic Sheet 108, the operator station 20 is responsible for supervising three SECTIONS.

The SECTIONS Overview Graphic Sheet 108 provides the following functions:

(1) It provides an overview of the SECTIONS assigned to the operator station;

(2) It indicates SECTION status through the information contained in each SECTION indicator 110;

(3) It allows navigation to a SEQUENCE, by clicking on the SECTION name 118, which causes the SEQUENCES Overview Graphic Sheet (FIG. 12) for that SECTION to be displayed in the SEQUENCES Overview Window 38;

(4) It displays the Master SECTIONS Flowsheet in the Plan Overview Flowsheet Window 40 when by clicking on the Master SECTIONS Graphic Sheet Navigation Marker 114. The Master SECTIONS Flowsheet illustrates all the SECTIONS in the domain of the operator station 20. One of the SECTIONS in the Master SECTIONS Flowsheet may be highlighted to select that SECTION as the current primary set of displayed information within the domain of information available to the Operator Station; and (5) It provides access to a PCC pop-up menu 120 which allows the operator to initiate the process of altering the values of specific PCC variables.

Figure 6:
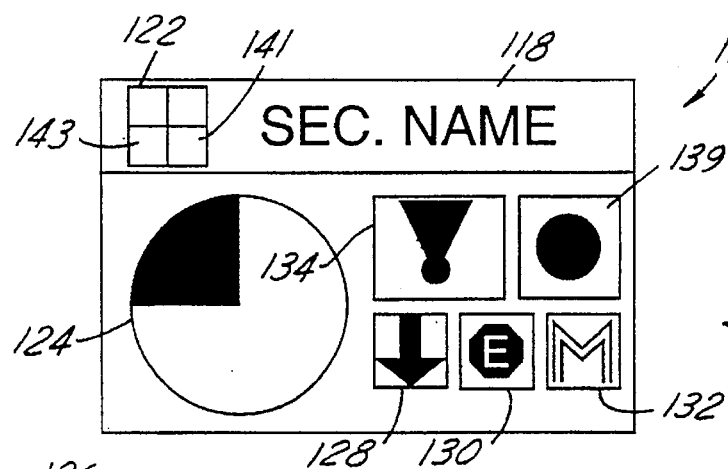
FIG. 6 is a SECTION indicator.

Referring now to FIG. 6, the SECTION indicator 110 provides status data for the SECTION via various symbols. The SECTION name 118 is a unique 10-character name identifying the SECTION. The SECTION status box 122 graphically describes the general state of the SECTION. The SECTION status box 122 preferably indicates one of four general states for the SECTION, depending upon which quadrant is shaded and the color of the shading. In the preferred embodiment, an outlined gray status box 122 indicates that all the process primitives and process field units in that SECTION are operating normally. The top-left and top-right quadrants are reserved for future use. The lower-right quadrant flashes lavender (for approximately one second) whenever the termination logic for any step in any SEQUENCE of the SECTION is true (i.e. all conditions have been met for proceeding to the next step). If no Hold-in-Step is in effect, the lavender flashes for one second as this step progression occurs. If a Hold-in-Step exists (as evidenced by the blue dot in the hold symbol 139), the lower-right quadrant will remain lavender until the Hold is released and progression to the next step occurs. A second reason for the lower-right quadrant to be lavender is the occurrence of an arbitration problem in the SEQUENCE-related logic of the two process control computers. If the lower-left quadrant is blue, there is a manual override in any variable that is associated with any SEQUENCE in that section. If the entire status box is lavender, information about this SECTION is unavailable. The most likely cause for this status is a loss of communication with the PCC(s) for that SECTION. It will be appreciated by those skilled in the art that other color-coded or pattern-based indicia may be utilized in the four quadrant status box 122 to indicate various predefined states of the SECTION. Similarly, various PFUs, process primitives, system variables and/or other preselected parameters associated with the SECTION may be used to provide the composite of information which determines the status reflected in the status box 122 for any particular SECTION.

Figures 7, 8, 9:
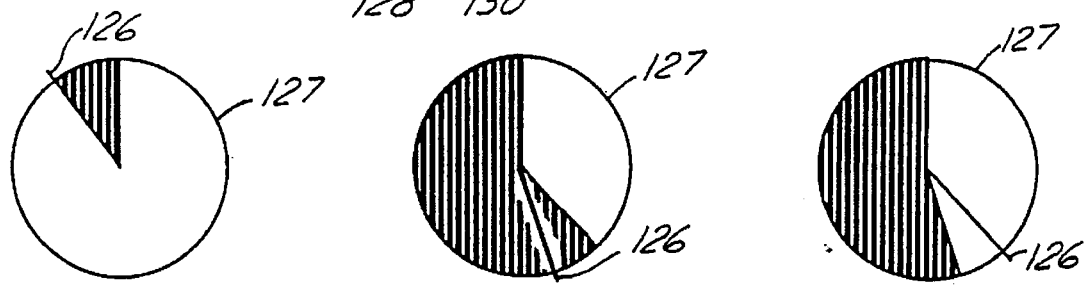
FIG. 7 is a CSF indicator showing a relatively stable CSF value.
FIG. 8 is a CSF indicator showing a relatively deteriorating CSF value.
FIG. 9 is a CSF indicator showing an improving CSF value.

The Critical Success Factor (CSF) indicator 124 provides another symbolic measure of how well the SECTION is performing as well as the incremental change in that performance. As previously described, the CSF indicator 124 (or 127) indicates to the operator at a glance the operating conditions of a particular SECTION (or SEQUENCE) as well as whether the process is operating in a steady state, deteriorating or improving, as illustrated in FIGS. 7–9. In the preferred embodiment, the shaded pie section always originates at the top of the circle, and grows in a counter-clockwise direction. The larger the size of the shaded pie section, the larger the CSF value, indicating increasing deviation from ideal operating conditions. In FIG. 7, the CSF object has a relatively small shaded area, and the trailing average indicator 126 is aligned with one boundary of the shaded and unshaded areas, indicating a relatively smoothly running SEQUENCE (or SECTION) in steady-state. In FIG. 8, the shaded area of the CSF indicator 127 (or 124) is significantly larger, indicating a relatively poorly running SEQUENCE (or SECTION), and the trailing average indicator 126 is inside the unshaded area indicating that the situation is deteriorating. In contrast, in FIG. 9, a moderate area of the CSF indicator 127 (or 124) indicates that the related SEQUENCE (or SECTION) is not running as smoothly as perhaps desired, but the trailing average indicator 126 is located in the unshaded area indicating improving operating conditions.

It will be appreciated by those skilled in the art that the CSF indicator 124 (or 127) provides a quick global assessment of a related SECTION or SEQUENCE by the operator, allowing the operator to determine at a glance whether review of more detailed information about that SECTION or SEQUENCE is required at any moment. In the preferred embodiment, the CSF indicator 124 in a SECTION indicator 110 corresponds to the most troublesome SEQUENCE in that SECTION and does not include a trailing average indicator. However, as will be appreciated by those skilled in the art, a CSF indicator for a particular SECTION could be based upon a calculation utilizing selected information from one or more SEQUENCES in that SECTION as well, and could also utilize a trailing average indicator if so desired.

Referring again to FIG. 6, the SECTION indicator 110 also preferably includes a shutdown flag symbol 128 which indicates whether the shutdown flag is set for any process primitive or process field unit in one or more of the SEQUENCES in that SECTION. The shutdown flag symbol is preferably a downwardly-pointing red arrow. It should be noted that if no shutdown flag is set in any of the SEQUENCES in the SECTION, the shutdown flag symbol 128 will not appear in the appropriate box of the SECTION indicator 110.

The SECTION indicator 110 also preferably includes an emergency flag symbol 130 which indicates whether the emergency flag is set in one or more of the SEQUENCES in that SECTION. The emergency flag symbol is preferably a red octagon with the character "E" inside the octagon.

Again, this symbol will not appear in the SECTION indicator if no emergency flag is set in any of the SEQUENCES in that SECTION.

The min/max alarm symbol 132 is also preferably included in a box in the SECTION indicator 110. This symbol indicates whether there is an active min/max alarm in one or more of the SEQUENCES in that SECTION. The min/max Alarm Symbol is preferably a relatively large "M" atop a relatively smaller "M". Again, if there is no active min/max alarm in any of the SEQUENCES in that SECTION, the box in this SECTION indicator 110 will be empty.

The unacknowledged alarm attention symbol 134 is also preferably included in the SECTION indicator. This symbol indicates whether there is any unacknowledged active alarm for any process primitive or process field unit in any of the SEQUENCES in that SECTION. The symbol is preferably a stylized lavender exclamation point having the shape shown in FIG. 6. If there are no unacknowledged alarms, the symbol is replaced by an active alarms box 135 which contains a number corresponding to the total number of active acknowledged alarms for all the SEQUENCES in that SECTION, as illustrated at 135 in FIG. 5.

The hold symbol 139 indicates whether a Hold-in-Step exists for any current step for any SEQUENCE in that SECTION. This symbol is preferably a blue dot. If no Hold-in-Step exists, the hold symbol 139 will be empty.

Referring to FIGS. 5 and 10, in a best contemplated mode the SECTION Overview Graphic Sheet 108 may also include one or more navigation markers 112 which, by positioning the cursor over the marker and clicking, allows the operator to navigate to a SECTION in the process he is allowed to access for information, but over which the operator station 20 has no data write access through which an operator could control that SECTION of the process. It should be noted that clicking on the navigation marker to navigate to a "hidden" SECTION will not change the display in the SECTIONS Overview Window 36. Instead, the SEQUENCES Overview Graphic Sheet (shown as in FIG. 12) corresponding to the SECTION identified in the navigation marker 112 will then be displayed in the SEQUENCES Overview Window 38. The navigation marker 112 also preferably includes the name (at 136) of the SECTION corresponding to the marker.

Referring to FIGS. 5 and 11, the SECTION Overview Graphic Sheet 108 also preferably includes one or more PCC indicators 116. The PCC indicator is a symbolic representation for a PCC which controls one or more SEQUENCES of interest to the operator station. The PCC indicator preferably includes a PCC status box 138 indicating the general state of the PCC, and a unique 4-character name for the PCC at 140. Clicking on the PCC indicator preferably activates a PCC pop-up menu which allows the operator to initiate the process of enabling a Bypass Manual Data Write (MDW) for the PCC by providing a dialog box for the secondary security-related process. A PCC data write is performed when an operator (typically through the common element pop-up menu) manually changes the value or state of a variable within the PCC. This PCC data write replaces the value of that variable which was earlier preselected by, used, or otherwise calculated by, the process control program running on the PCC. As previously described, a Bypass MDW can be performed by a particular operator station 20 only if the process computer communication system 72–90 permits the particular bypass MDW for that PCC. The PCC status box 138 may indicate (preferably by blue shading in the lower left quadrant of the status box) that the Bypass MDW is enabled, thereby indicating to the operator that a bypass PCC data write may be initiated. The lower-right quadrant of the status box 138 indicates (preferably by lavender shading) that a general hardware problem exists in the PCC. In PCCs having redundant computer architecture, a red upper-left quadrant indicates that the arbitration diagnostic reporting capability is limited for the one of the two computers that is currently designated as the primary computer in the PCC.

It should be appreciated that, in systems which employ process control communications systems as interfaces between the PCC and the operator station, a process control communication system status box 145, analogous to the PCC status box 138, may be employed. As with the PCC status box 138, a process control communication system indicator might include a status box indicating the general state of the process control communication system and a unique name for the communication system. And, as with the PCC status box 138, the communication system status box 145 might include pop-up menus which, when activated, would allow the operator to initiate commands for performing any desired functions relative to the communication system. In the preferred embodiment, the upper-left quadrant of the process control communication system status box 145 turns red if the compile version identifiers in the security tables in the process control communication system 72–90 is not in agreement with either of the two PCC computers. The lower-left quadrant will turn blue if the Manual Data Write or the Bypass Manual Data Write has been disabled by the process control communication system for that operator station. The lower-right quadrant will turn lavender when the secondary process control communication system has been selected to handle communications to this operator station. The upper-right quadrant will be blue when the operator station is requesting process control data from the secondary computer of the PCC.

The operator station 20 system preferably allows the operator to take several actions in the SECTIONS Overview Window 36. For example, the operator monitors the SECTION indicators 110 for all the SECTIONS, including the CSF indicator 124, the status of all the alarm flags 128–134 and the PCC status box 138 for each PCC supporting SEQUENCES in that SECTION. At any indication of trouble from these graphic indicators, the operator can click on the master SECTIONS graphic sheet navigation marker 114 to obtain the master SECTIONS graphic sheet associated with the operator station 20. And, as will be described more fully hereinafter, the operator could also click on the master SEQUENCES graphic sheet navigation marker 142 to display the master SEQUENCES graphic sheet in the Plan Overview Flowsheet Window 40. In an alternative contemplated embodiment, other flowsheets and graphic sheets can be viewed by clicking on navigation markers (not shown) contained in the master SECTIONS graphic sheet and master SEQUENCES graphic sheet. Depending on the nature of the problem, the operator could click on a PCC indicator 116 in the SECTIONS Overview Window 36 to activate a pop-up menu to initiate the security procedure in the process of a Bypass MDW as previously described for a critical switch or process variable, thus altering the PCC's data base used in the automated control of that part of the manufacturing process.

Other commands may be defined and invoked in the SECTIONS Overview Window 36 without departing from the spirit of the present invention.

It will thus be appreciated by those skilled in the art that the SECTIONS Overview Graphic Sheet 108 in the SEC- TIONS Overview Window 36 provides the operator with easily and quickly identifiable graphic information characterizing the general status of the SECTION and the key parameters for critical SEQUENCES in this SECTION, from which the operator may navigate to more detailed information when a potential problem is identified. The SECTIONS Overview Graphic Sheet 108 provides rapid access to specific sets of SEQUENCE information through activation of various displays in the SEQUENCES Overview Window 38 as well as additional on-line documentation, providing the operator with real-time assistance with the operator station 20.

Referring now to FIG. 12, the SEQUENCES Overview Graphic Sheet 144 in SEQUENCES Overview Window 38 provides a more detailed overview of a part of the plant than the SECTIONS Overview Graphic Sheet 108 described above. It indicates the overall state of all the SEQUENCES in a selected SECTION, allowing the operator to identify specific SEQUENCES that need attention or supervision at a greater level of detail. The SEQUENCES Overview Graphic Sheet 144 also allows the operator to navigate to selected SEQUENCE flowsheets in the Plant Overview Flowsheet Window 40 similar to the SECTION Overview Graphic Sheet 108. The SEQUENCES Overview Graphic Sheet 144 also provides status information at a glance via status box 123, CSF indicator 127, alarm symbols 129, 131, 133, 137, and 152, hold symbol 154, and current step number 150, for each of the SEQUENCES in a selected SECTION.

Like the SECTIONS Overview Window 36, the SEQUENCES Overview Window 38 is part of the startup screen on the primary display 26, and cannot be closed, moved, resized or shrunk to an icon. Also like the SECTIONS Overview Window 36, the SEQUENCES Overview Window 38 preferably has no scroll bars. The entire SEQUENCES Overview Graphic Sheet 144 for a selected SECTION is visible within the window at all times. Finally, as with the SECTIONS Overview Window 36, any pop-up menus that are superimposed on the SEQUENCES Overview Graphic Sheet 144 will obscure the graphics only for so long as the mouse pointer is in the window or until a timer (set for a preselected duration) expires.

The SEQUENCES Overview Graphic Sheet 144 includes a SEQUENCE indicator 146 corresponding to each of the SEQUENCES in the SECTION. Referring to FIG. 13, the SEQUENCE indicator is similar in format and graphic content to the SECTION indicator 110 except, of course, that the symbols in the SEQUENCE indicator 144 represent the status of the SEQUENCE. The SEQUENCE indicator 146 includes symbols 129, 131, 133, 137 and 154 which provide the identical information as described above for symbols 128, 130, 132, 134 and 139 in connection with the SECTION indicator 110 for the SEQUENCE. Like the SECTION indicator 110, the SEQUENCE indicator 146 also includes unique SEQUENCE name 148, a SEQUENCE status box 123 indicating the general status of the SEQUENCE, and a CSF indicator 127 which provides an abstract indication of the SEQUENCE'S overall status. The CSF indicator 127 in the SEQUENCE indicator 146 is preferably similar in format to the CSF indicator 124 in the SECTION indicator 110, except, in the preferred embodiment, the CSF indicator 127 for each SEQUENCE includes a trailing average indicator 126 (as previously described and as illustrated in FIGS. 7–9). The SEQUENCE indicator 146 also contains the number of the current step, at 150, and the total number of all active alarms in the SEQUENCE, at 152. The SEQUENCE indicator 146 also preferably includes a Hold-In-Step flag 154 which indicates that the current step in that SEQUENCE has been placed in hold status.

The operation and interpretation of SEQUENCE status box 123 parallels the operation and interpretation of section status box 122 (shown in FIG. 6) except that the domain being addressed by the SEQUENCE status box 123 relates to the relevant SEQUENCE. In contrast, the domain of the SECTION status box 122 relates to a collection (a SECTION) of SEQUENCES.

Figure 14:
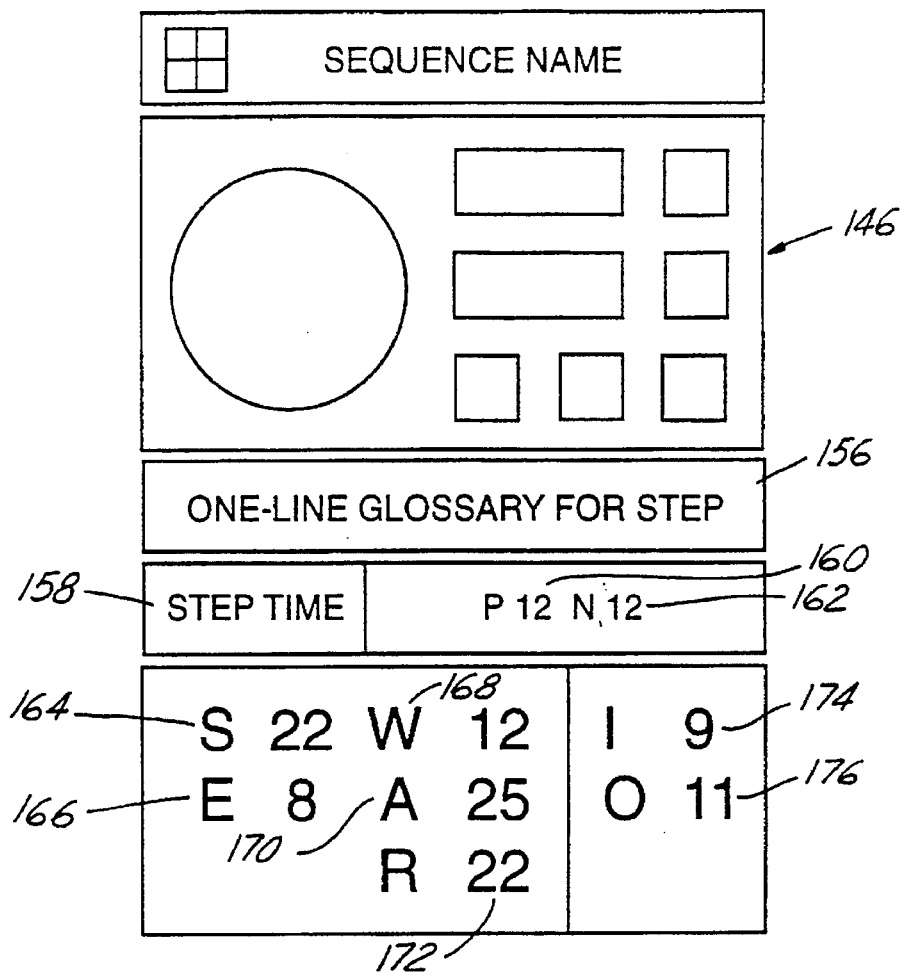
FIG. 14 is a SEQUENCE indicator in extended mode.

Referring to FIG. 14, the extended mode of a SEQUENCE indicator 146 may be invoked by choosing the "Detail" option from the common element pop-up menu. In the extended mode, the SEQUENCE indicator 146 displays additional selected SEQUENCE information in a box immediately below the normal SEQUENCE indicator. In the preferred embodiment, this additional information is in text form and includes the following:

(a) The step glossary identifier 156;

(b) The elapsed time in the current step 158;

(c) The present recipe 160;

(d) The next recipe 162;

(e) The number of active shutdown alarms 164;

(f) The number of emergency alarms 166;

(g) The number of active warning alarms 168;

(h) The number of active alert alarms 170;

(i) The number of active request alarms 172;

(j) The number of inputs in manual 174; and (k) The number of outputs in manual 176.

Figure 15:
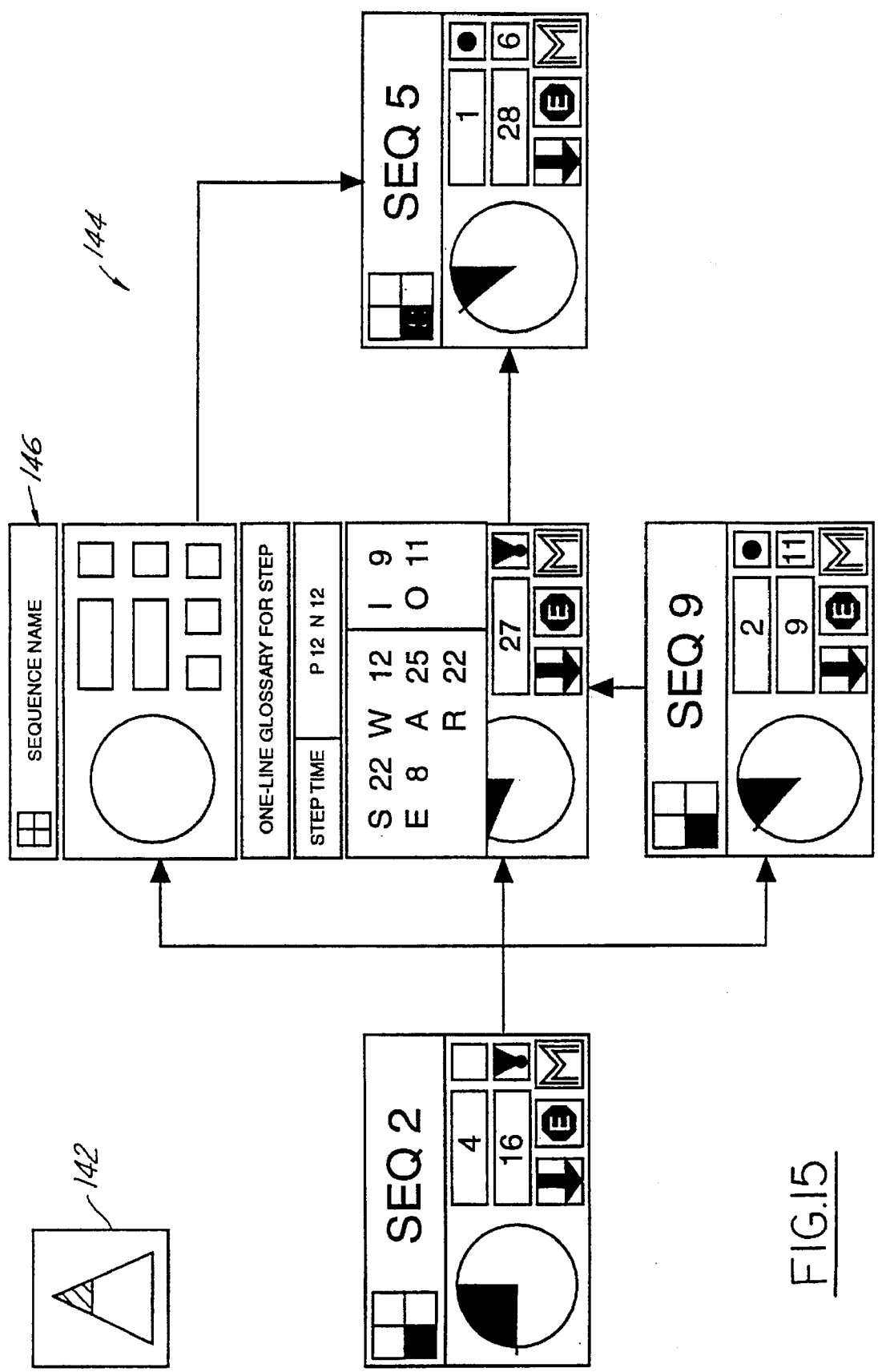
FIG. 15 shows a SEQUENCE indicator in extended mode in a typical SEQUENCES Overview Window.

As shown in FIG. 15, the extended mode of a SEQUENCE indicator 146 may obscure a portion of the SEQUENCES Overview Graphic Sheet 144. In one embodiment, the system automatically returns the extended mode SEQUENCE indicator 146 to its normal mode after a fixed, pre-selected period of time. In another embodiment, the information contained in the extended mode SEQUENCE indicator 146 is depicted in a separate and independently controlled window, which can then be moved to another position or closed, as desired. It should be noted that, as with the SECTIONS Overview Graphic Sheet 108, the SEQUENCES Overview Graphic Sheet 144 may include a Master SEQUENCES Graphic Sheet navigation marker 142 which, when clicked on, displays the Master SEQUENCES Graphic Sheet. The Master SEQUENCES Graphic Sheet (not shown) is displayed in the Plant Overview Flowsheet Window 40 and contains a unique symbolic representation of the actual processes, in overview, for all of the SEQUENCES in a specific SECTION.

Thus, as will be appreciated by those skilled in the art, the SEQUENCES Overview Window 38 provides the operator with a quick and familiar indication of the status of all of the SEQUENCES in a selected SECTION, through monitoring the status box, CSF indicator, and alarm flags for each SEQUENCE. Additional critical SEQUENCE information for any one SEQUENCE can be quickly accessed by invoking the extended mode for that SEQUENCE indicator 146. If further attention to a particular SEQUENCE is indicated, the operator may request additional information for that SEQUENCE by clicking on the SEQUENCE Name 148 in the corresponding SEQUENCE indicator 146 to invoke display of the associated SEQUENCE flowsheet in the Plant Overview Flowsheet Window 40 as hereinafter described. As will also be appreciated by those skilled in the art, once the operator is monitoring an individual SEQUENCE, he/she may observe and manipulate additional information for that SEQUENCE through the trend and the AME windows (as further described hereinafter) to examine more granular detail about the selected SEQUENCE. The operator may also invoke the common element pop-up menu by clicking elsewhere on the SEQUENCE indicator 146. The common element pop-up menu will then allow the operator to acknowledge alarms, clear Hold-in-Step status and/or change the value of other variables related to a selected SEQUENCE.

Figure 16:
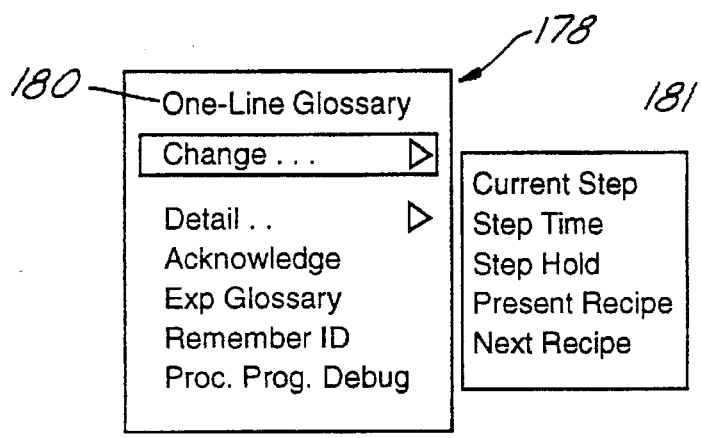
FIG. 16 is a typical common element pop-up menu with an associated cascaded menu (in this case for a SEQUENCE)

FIG. 16 illustrates the commands that are preferably available in the common element pop-up menu 178. As previously described, the common element menu can be invoked in the SEQUENCE Overview Window 38 by clicking on a SEQUENCE indicator 146 in an area other than the SEQUENCE name 148, or in any flowsheet window, trend window, unacknowledged alarm window, active alarm window, elements-in-manual window, or alarm grid by clicking on an icon corresponding to a particular common element. In addition, as previously described, the common element functions can also be invoked via the Main Menu 44 by activating the Select command. All of the options available for any common element are preferably displayed in pop-up menu 178. However, it should be noted that not all of the displayed commands can be invoked for every common element. When the pop-up menu 178 is invoked, any function which is invalid for the particular common element for which the menu 178 is invoked is preferably non-selectable and therefore displayed in gray.

The "One-line Glossary" command 180, when invoked, displays a brief one-line description for the common element chosen.

The "Change" command allows initiation of the process of changing the value and display format of a variable or a constant. Functions preferably available through the Change command include putting a PCC process input or output in manual, changing the value of a process input or output which has been put into manual override, changing the value of a constant, changing the range of a variable, and entering a "Hold-in-Step" status for a particular step in a SEQUENCE in the PCC. When the Change command is typically invoked, a cascade menu such as that shown at 181 preferably presents a list of specific Change commands associated with the common element chosen. It should be noted that these commands may vary depending upon the type of common element chosen. In FIG. 16, an example for a SEQUENCE is presented wherein a common element pop-up menu 178 has been activated, and the change option further selected to activate cascade menu 181 to access options which initiate inputs to modify attributes of the relevant SEQUENCE in the PCC. In this example, the Change command would typically allow the operator to change the current step, the step time, put the step in hold status, view or change the present recipe, or change the next recipe.

The "Detail" command invokes a dialog box from which various additional details relating to the chosen common element can be selected. For example, the dialog box may display a diagnostic screen for the selected common element, a detailed flowsheet associated with the common element, or an expansion sheet for a PFU common element, or a SEQUENCE indicator in extended mode.

The "Acknowledge" command allows alarm acknowledgement and is available from either a SEQUENCES common element or alarm common element displayed on the operator station. It should be noted that, in the preferred embodiment, alarm acknowledgement implements acknowledgement of all unacknowledged alarms in a SEQUENCE.

The "Exp Glossary" command invokes the expanded glossary dialog box which allows for selection from a list of several levels of additional related glossaries. These related glossaries contain process dependent help text such as additional description, program action, recommended operator action, expert information, plant settings, diagrams, attribute settings, and associated key words. This related process-dependent help text can be further organized into levels or categories which are common within the local organization to make the information access process more efficient and to simplify training.

The "Remember ID" command, when invoked, "remembers" the chosen common element so that it can be depicted in a plot in a trend window. If a group is associated with this instance of the common element, the whole set is preferably plotted on request in this same manner.

The "Proc Prog Debug" command is also preferably provided for displaying a list of all the process program statements which reference the selected common element.

Every Change dialog box preferably includes an identification display showing instance of the common element being referenced, the changes which can be implemented to the instance of the common element, an actual value display showing the current values for that instance of the common element in both PCCs (if a redundant configuration is deployed), the Change value entry fields which permit definition of new values or ranges (as appropriate to the chosen instance of the common element), a modified view area which permits the determination of the units, or format, in which the value data for the instance of the common element is displayed, and an action button to implement changes and/or close the dialog box.

Figure 33:
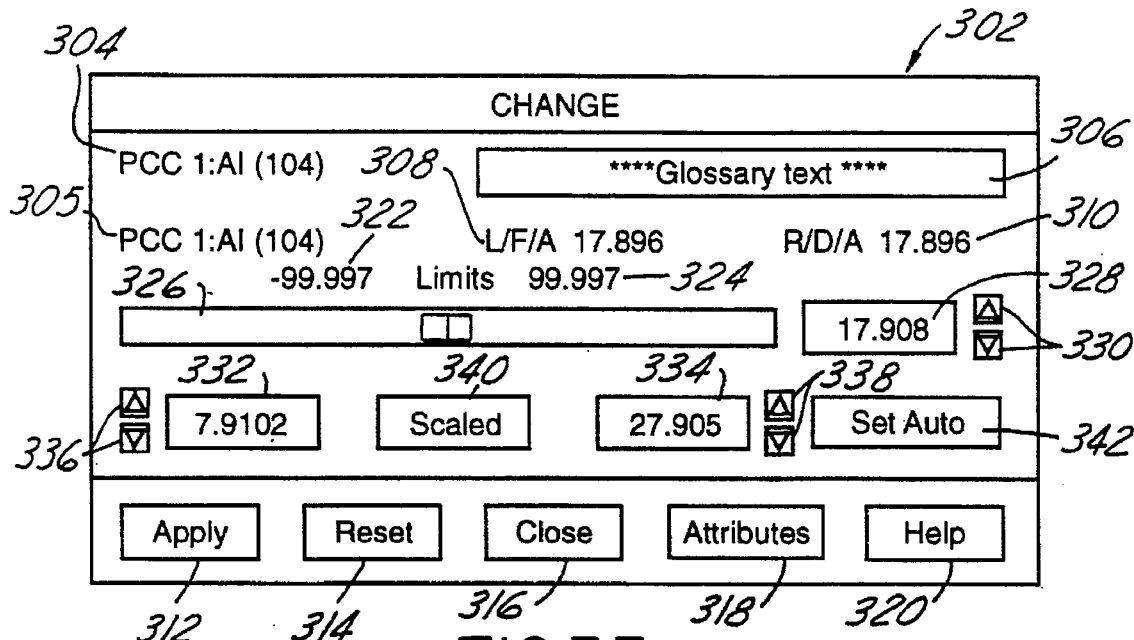
FIG. 33 is a typical Change Dialog Box.

Referring to FIG. 33, a sample Change dialog box 302 illustrates the components typically employed in connection with a value change. The Change dialog box 302 illustrated in FIG. 33 is depicted for an analog variable which is typically representative of the most complex of the elements that would be changed through a Change dialog box. The identification of the selected change element is typically displayed at 305, as well as the primary PCC variable, at 304, with which the change element is associated. In many cases, the change element and the primary element are the same. However, if, for example, the selected element is an attribute of an associated variable, the attribute variable is the change element and the associated variable is the primary element. Also, for SEQUENCE related elements such as steps and recipes, the primary element is the SEQUENCE name, and the change element is the selected step or recipe attribute to be changed. A one-line glossary, at 306, is typically included for the primary element and additional glossary entry may also be included where the change element is not identical to the primary element. Where redundant computers are employed by the PCC, the values of the change element in each of the computers is typically displayed at 308 and 310.

Each Change dialog box 302 includes a plurality of action buttons such as those displayed at 312–320. When clicked on, the "Apply" button 312 implements any actions selected in the dialog box, but leaves the dialog box open. The "Reset" button 314 updates the dialog box to display the default settings based on the current live value for the element. The "Close" 316 closes the dialog box with no further action taken. The "Attributes" 318 displays a list of attribute variables associated with the primary element related to the element being changed. A "help" button 320 allows the operator to invoke an on-line help feature relating to the particular dialog box.

When the Change dialog box 302 is associated with a variable, the upper and lower limits for that variable are generally displayed, at 322 and 324, respectively. A value slider 326 is also typically included in a value Change dialog box to allow the operator to quickly change the value of the selected element. A value box 328 displays the value of the element, updated to reflect any actions taken by the operator in the dialog box. The value of the element can be changed directly in the value box 328 in one of two ways:

(1) the operator can click-on the value box to invoke the cursor, use the keyboard arrows to erase all or part of the existing value, and type in a new value; or (2) the operator can double-click on the value box to highlight the value, and type in a new value to automatically overwrite the old value.

A value stepper 330 is also typically included to allow for modification of the element by clicking on the up arrow or down arrow of the stepper to increment or decrement respectively the lowest digit of the current value. The lower boundary of the value scale for the value slider 326 is illustrated at 332, and the upper boundary for the value slider scale is illustrated at 334. These scale boundaries may be varied by clicking on the appropriate steppers 336 and 338. A data format option 340 is also preferably provided. When clicked on, this option typically allows the operator to specify that data values be displayed in scaled, integer, or fraction format. A PCC data write option button 342 allows the operator to manage the transition between automatic and manual status as desired for the element.

It will be appreciated by those skilled in the art that various Change dialog boxes similar in format to the Change dialog box 302 shown in FIG. 33 may be employed for changing the values of other types of PCC variables, such as digital variables, recipe variables, and step-related parameters.

It will be appreciated by those skilled in the art that other commands which are often used in connection with common elements may be implemented through the common element pop-up menu 178. The incorporation of a common element pop-up menu, which may be accessed from virtually any window on the primary display 26 or secondary display 28 of the operator station 20, provides a powerful and efficient tool for accessing or changing values or attributes relating to specific instances of common elements relating to the manufacturing process.

Referring now to FIGS. 1, 3, and 17, the system's flowsheet application preferably provides for the display of graphic sheets in the Plant Overview Flowsheet Window 40. In addition, other flowsheet windows (not shown) may be created by the operator to display additional graphic sheets on the secondary display 28. The Plant Overview Flowsheet Window 40 preferably displays either the Master SECTIONS Graphic Sheet, the Master SEQUENCES Graphic Sheet, or selected other SEQUENCE flowsheets. Like the SECTIONS Overview Window 36 and SEQUENCES Overview Window 38, the Plant Overview Flowsheet Window 40 appears at the startup of the operator station 20, is displayed at all times, cannot be closed, and cannot be resized, moved or shrunk to an icon. In the preferred embodiment, a flowsheet is always displayed at all times in the window, with navigation to different flowsheets provided by clicking on the Master SEQUENCES (or SECTIONS) navigation marker 142 (or 114), the SEQUENCE name 148 in a SEQUENCE indicator 146, or by calling a flowsheet by name through invocation of a command after activating the common element pop-up menu 178.

The operator station 20 preferably provides for display of the following types of flowsheets:

Master SECTIONS Graphic Sheet—as previously described, this graphics sheet shows a graphical overview of the manufacturing process relevant to all the SECTIONS assigned to the operator station. It may be invoked in the Plant Overview Flowsheet Window 40 by clicking on the Master SECTIONS graphic navigation indicator 114 in the SECTIONS Overview window 36.

Master SEQUENCES Graphic Sheet—as previously described, this graphics sheet shows graphical overview of that part of the manufacturing process related to all the SEQUENCES assigned to a specific SECTION of the operator station. It may be invoked in the Plant Overview Flowsheet Window 40 by clicking on the Master SEQUENCES graphic navigation indicator 142 in the SEQUENCES Overview Window 38.

Detail Sheets—these detailed flowsheets include step diagrams, controller diagrams, and expansion sheets. Step diagrams illustrate one or more steps in a SEQUENCE in detail, showing process primitives associated with the steps, and a graphical depiction of their interrelationship. A controller diagram graphically illustrates a process dynamics control block in detail, including each process primitive associated with the illustrated control block. Expansion sheets (like controller diagrams) show every process primitive associated with an instance of a PFU. Other similar detail flowsheets may be displayed by invoking the "Detail Command" within a pop-up menu to show other associated flowsheets useful in relating to the manufacturing process.

FIG. 17 shows a typical flowsheet 182. Each flowsheet 182 contains a predefined and fixed view of a portion of the process in the plant illustrating actual manufacturing process elements and/or instances of PFUs (such as pumps, valves, reactors, etc.) 350 in a symbolic form. The flowsheet 182 preferably displays process primitive graphical symbols and graphical symbols associated with instances of process field units included in that portion of the manufacturing process displayed by the flowsheet 182. The graphic symbols may include text and numerical information corresponding to selected process data associated with the process primitives, such as, for example, the current value for analog input and/or output variables, the current state for digital input and/or output variables and/or current alarm states or values. The graphic symbols incorporated in a flowsheet preferably include a status box 125 for process primitives which may be associated with PCC variables such as analog inputs, digital inputs, analog outputs, or digital outputs, or with more comprehensive process elements such as PFUs shown on the flowsheet. As with the status boxes 122 associated with the SECTION indicators 110 and the status boxes 123 SEQUENCE indicators 146, the status boxes 125 in graphic sheets utilize the same color coding scheme described above to indicate the general status of the related process element. Any object with an associated status box 125 is accessible as a common element, and as such is subject to the functions available in the common element pop-up menu. Thus, as previously described, by invoking commands via pop-up menus from the graphic sheets, a PCC data value associated with a process primitive can be changed, additional glossary information about an element, PFU, or process primitive can be accessed, an alarm can be acknowledged, the step in a SEQUENCE can be changed, the recipe can be changed, and trend related functions on variables can be implemented.

Also, through the commands of the pop-up menu 178, additional information, such as additional process inputs, outputs, and alarms associated with a particular entity can be displayed. In this manner, an additional level of detail of information for some of the entities displayed in a graphic sheet 182 can be ascertained.

Navigation markers 112 may also be included in graphic sheets. In some cases, the marker indicates the next or previous segment of the process. In other cases, an amplifying navigation marker 352 indicates a more detailed presentation of some part of the current sheet, or a less detailed depiction of the current sheet as a part of a larger graphic sheet. The navigation marker 112 is preferably labeled with text identifying the flowsheet it invokes. The flowsheet indicated by the navigation marker 112 may be invoked by clicking on the marker.

A master flowsheet navigation marker 184 may be created for the purpose of quick and easy display of a single selected flowsheet which is designated as the master flowsheet. This flowsheet may be the master SECTION's graphic sheet, the master SEQUENCE's graphic sheet, or another flowsheet or graphic sheet that has been designated as the master flowsheet.

The Plant Overview Flowsheet Window 40 also preferably displays other graphic sheets corresponding to SECTIONS, SEQUENCES, or portions thereof that require frequent monitoring. For example, the Master SEQUENCES Graphic Sheet, which contains an overview of all the SEQUENCES in a specific SECTION of the plant, and the Master SECTIONS Graphics Sheet which contains an overview of all the SECTIONS that are assigned to the operator station 20, may be displayed on the Plant Overview Flowsheet Window by clicking on the appropriate navigation marker as described above. In addition, other SEQUENCE flowsheets corresponding to critical SEQUENCES or portions thereof may be displayed in the Plant Overview Flowsheet Window.

It should be noted that the Flowsheet-Dependent Trend Window 42 displays trend data for selected primitives and/or process variables associated with the flowsheet currently displayed in the Plant Overview Flowsheet Window 40. As with other Plant Overview Windows, the Flowsheet-Dependent Trend Window 42 (hereinafter described in greater detail) is always active. The contents of the Flowsheet-Dependent Trend Window 42 always correspond to the contents of the Plant Overview Flowsheet Window 40, and contents are automatically changed whenever a new graphic sheet is displayed in the Plant Overview Flowsheet Window 40. Thus, flowsheets and other graphic sheets which have critical variables for which trends must be monitored, are preferably accessed via the Plant Overview Flowsheet Window 40 so that those trends are automatically simultaneously displayed in the Flowsheet-Dependent Trend Window 42.

Additional flowsheets and other types of graphic sheets can be invoked and displayed in additional flowsheet windows on the secondary display 28. The system provides for creation of a Flowsheet-Independent Trend Window (as hereinafter further described and shown in FIG. 21) to display trends for selected process primitives or variables associated with flowsheets or other graphic sheets displayed in the additional flowsheet windows on the secondary display 28. However, unlike the Plant Overview Flowsheet Window 40, there is not an automatic one-to-one relationship between an additional flowsheet window created for display on the secondary display 28 and a Flowsheet-Independent Trend Window. Thus, unlike the Plant Overview Flowsheet Window 40 and Flowsheet-Dependent Trend Window 42, the contents of the Flowsheet-Independent Trend Window on the secondary display 28 will not necessarily change when the operator elects to display a different graphic sheet in the additional flowsheet window.

Unlike the preferred characteristics of the Plant Overview Flowsheet Window 40, additional flowsheet windows created for display on the secondary display 28 do not automatically appear on system startup. Also, an additional flowsheet window, once defined, may be moved, resized, shrunk to an icon, or closed altogether. When the window is resized, the objects on the graphic sheet preferably remain the same apparent size, with only partial display of the graphic sheet contained therein. Thus, the additional flowsheet windows are preferably provided with horizontal and vertical scroll bars to allow the operator to pan the graphic sheet in order to display the desired portion of the flowsheet in the less than full sized window.

The "Flowsheet" option may be selected from the Main Menu 44 to create a new flowsheet window and display a graphic sheet therein. The default graphic sheet displayed in the new flowsheet window is preferably the same graphic sheet that is currently displayed in the Plant Overview Flowsheet Window 40 on the primary screen 26 at the time the additional flowsheet window is created.

The system preferably provides a number of ways of accessing a particular existing graphic sheet in the Plant Overview Flowsheet Window 40 or in an additional window opened on the secondary display 28. As previously described, selection of a particular SECTION in the SECTION Overview Window 36 automatically results in display of the associated Master SECTIONS Graphic Sheet in the Plant Overview Flowsheet Window 40. Selection of a particular SEQUENCE in the SEQUENCE Overview Window 38 likewise preferably automatically results in display of the associated Master SEQUENCES Graphic Sheet in the Plant Overview Flowsheet Window 40.

Alternatively, flowsheets may be provided with a navigation marker 112 which may be clicked on to automatically display another preselected graphic sheet in the same flowsheet window. For example, when a SEQUENCE is represented by many SEQUENCE flowsheets with differing levels of detail, a hierarchy can be created by providing a navigation marker 112 in each of the SEQUENCE flowsheets and by associating a selected other flowsheet which is automatically displayed when the navigation marker is clicked on.

Additionally, a graphic sheet can be displayed by clicking on "File" in the menu bar 186 of the appropriate flowsheet window and selecting "Open" to invoke the dialog box shown in FIG. 18. The name of the flowsheet can then be typed in the dialog box 188, and will appear on the entry line 190 as shown. By clicking on "OK", the selected flowsheet will be displayed in that particular flowsheet window. The File menu also preferably includes a "Select Flowsheet" command which, when invoked, displays the dialog box 192 shown in FIG. 19. This dialog box 192 is preferably provided with a scroll bar to allow the operator to scroll through a graphic sheet queue 194 associated with each flowsheet window. The graphic sheet queue is a dynamic list of a preselected number (such as the last 20) graphic sheets displayed in its associated flowsheet window. The operator can survey any of the previously displayed flowsheets to select that sheet from the queue for display in the window.

It should be noted that the features of FIGS. 18 and 19 could alternatively be combined into one interactive dialog box without departing from the spirit of the invention.

The system preferably also includes a "Select Previous" feature which may be invoked from the "File" command on the menu bar 186 of the flowsheet window. The "Select Previous" feature will automatically display the graphic sheet displayed previous to the currently displayed graphic sheet.

The menu bar 186 is preferably included in the Plant Overview Flowsheet Window 40 as well as in any additional flowsheet window. The menu bar 186 may include any menus which, when selected, provide additional commands useful to the operator in defining, selecting, organizing, or operating on any data displayed in the associated flowsheet window.

In addition to the "File" menu, the menu bar 186 may also include a View menu which, when implemented, allows the operator to change the format of the analog or digital value of any process variables displayed in a particular flowsheet. For example, the View menu may include "Scaled", "Integer", and "Fraction" buttons which, allow for Scaled, Integer, or Fractional representations respectively of analog variables displayed in a flowsheet when an option of "Analog Format" is selected from the View menu. Likewise, in one contemplated mode, selection of a "Digital Format" option may invoke a dialog box including "True/False", "1/0", and/or "Logic Tag" buttons that allow for display of digital values in True/False, 1/0, or Logic Tag formats respectively when selected for those digital values displayed in a particular graphic sheet.

The menu bar 186 may also include a Help menu which, when implemented, displays on-line documentation describing the current window or currently selected tasks performed within the current window.

Figure 34:
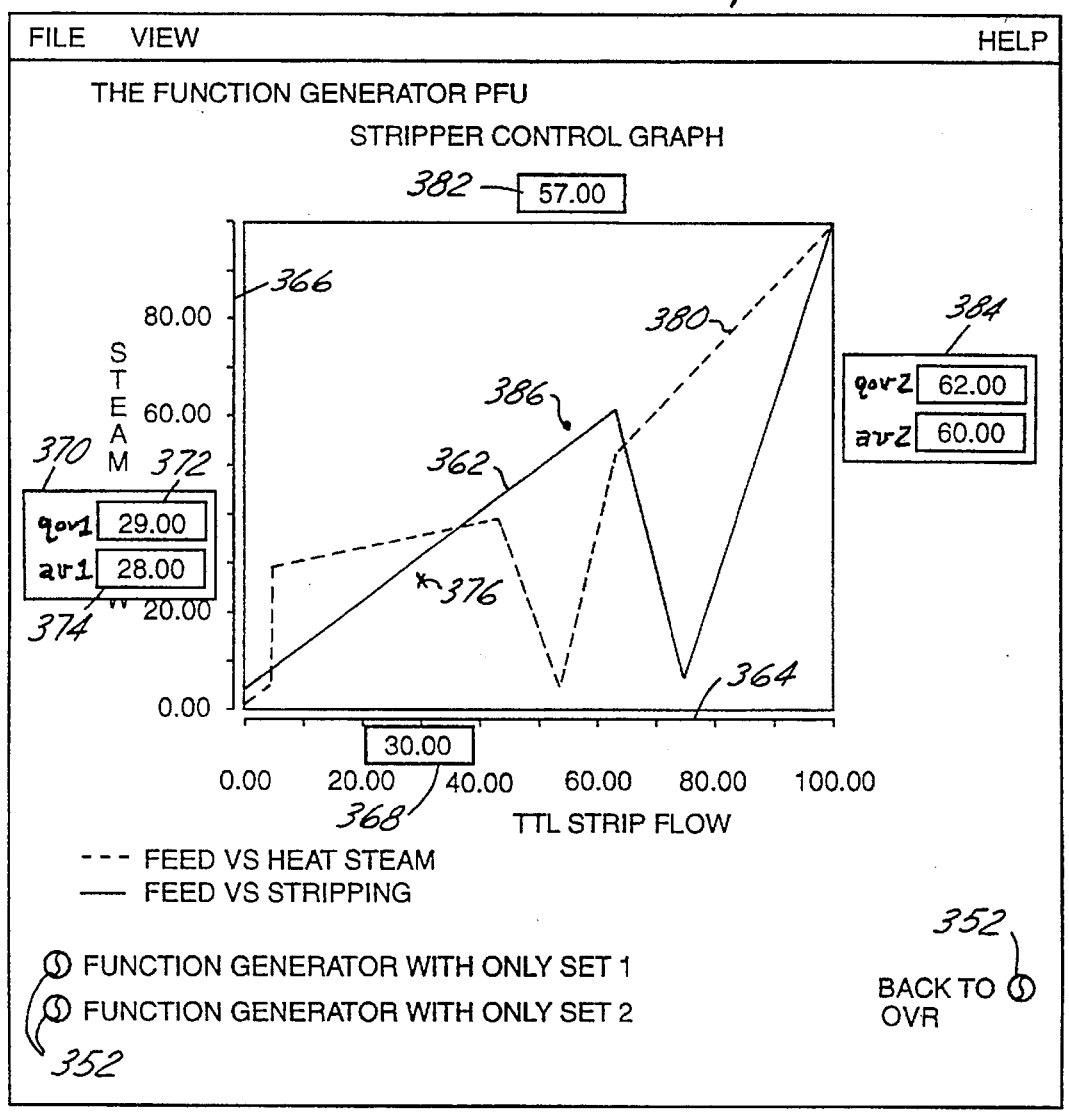
FIG. 34 is a Function Generator PFU Window.

Referring to FIG. 34, the Function Generator PFU is one particular type of PFU which may be implemented in the operator station. The Function Generator PFU may appear as an icon on a flow sheet or graphic sheet. When clicked upon, an expansion window 360 is opened, displaying at least one set of associated PCC variables. As shown in FIG. 34, a Function Generator PFU typically includes a first locus of points 362 indicating a function representing an ideal relationship between a first independent variable and a first dependent variable, cartesian coordinates defining an independent axis 364 and a dependent axis 366, an independent variable indicator 368, and a dependent variable indicator 370. The independent variable indicator 368 includes a box containing the actual real-time value 374 of the independent variable. The independent variable indicator 368 may be positioned along the independent axis 364, thereby also graphically indicating the value of this variable. The dependent variable indicator 370 is a box containing two values relating to the dependent variable, the qualified optimum value 372, which is an acceptable optimum value of the dependent variable derived in real-time in light of current operating conditions, and the real-time actual value of the dependent variable. In addition, the dependent variable indicator 370 may also be physically located along the dependent axis to graphically reflect the actual real-time value of the dependent variable. A graphic indication, at 376, of the intersection of the current real-time values for the subject PCC variable may be depicted, to graphically indicate the relationship between the current actual dependent and independent values and the ideal, represented by the first locus of points 362.

In the embodiment shown in FIG. 34, two sets of relationships (which may or may not be interrelated) are represented in a single expansion window for Function Generator PFU. Thus, the same expansion window simultaneously illustrates a second locus of points 380, an associated actual value indicator for a second independent variable indicator 382, a second dependent variable indicator 384, and a second graphic representation, at 386, of the intersection of the current actual values of the second independent and second dependent variables. Thus, the expansion window 360 provides a simultaneous graphic representation of an ideal value, a qualified optimum value, and an actual value for at least one independent variable and an associated dependent variable in a mathematically functional relationship, thereby providing three different viewpoints respecting the verity of the functional relationship between the independent and dependent variable.

The expansion window 360 may also include one or more amplifying navigation markers 352 which, when clicked upon, provide variations in the graphical representation of the data, or which return the display from the expansion window 360 back to the original display (such as the flow sheet containing the PFU from which the expansion window 360 was called).

Figure 20:
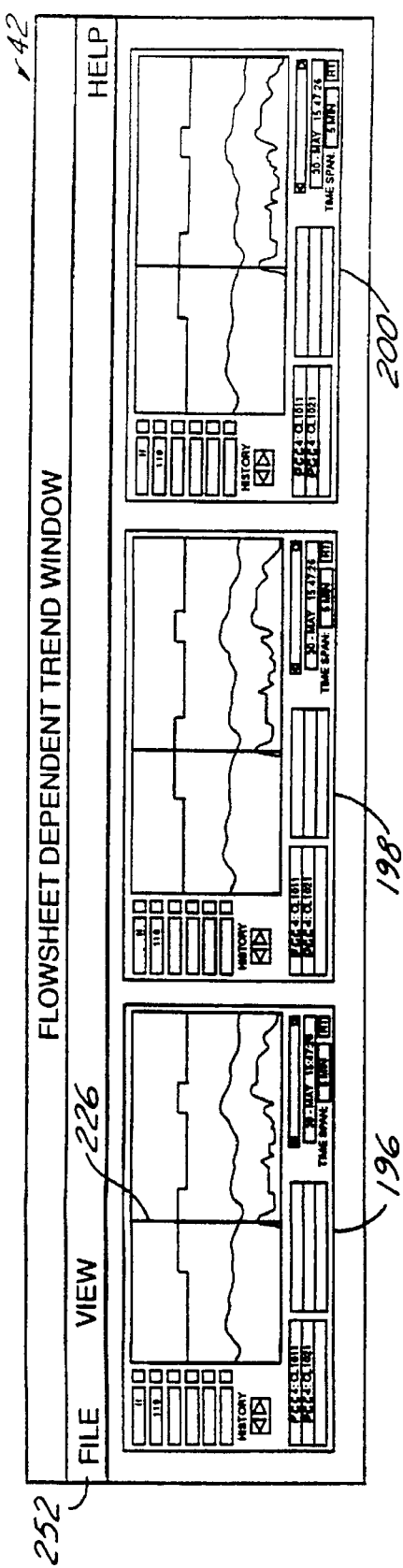
FIG. 20 is a typical Flowsheet-Dependent Trend Window.

Referring now to FIG. 20, the primary display 26 preferably includes a Flowsheet-Dependent Trend Window 42 which displays trend data for selected variables associated with the graphic sheet currently displayed in the Plant Overview Flowsheet Window 40. Like the Plant Overview Windows 36–40, the Flowsheet-Dependent Trend Window 42 is always active, and may not be moved, changed in size, or closed.

The Flowsheet-Dependent Trend Window 42 preferably displays three predefined line graphs 196, 198, and 200, each displaying the trends of up to six PCC variables as time-correlated data point primitives in each line graph (trend lines) such as at 214, 216, and 218. In the preferred embodiment, one Flowsheet-Dependent Trend Display 42 thus has the capability to display the trend lines for 18 PCC variables.

As previously described, the line graphs 196, 198, 200 correspond on a one-to-one basis with process primitives or variables associated with the currently displayed graphic sheet in the Plant Overview Flowsheet Window 40. Thus, the line graphs appearing in the Flowsheet-Dependent Trend Window 42 may change if the graphic sheet in the Plant Overview Flowsheet Window 40 is changed. However, in the preferred embodiment, one given trend display can be associated with more than one flowsheet. In this special case, the Flowsheet-Dependent Trend Window 42 will not be rebuilt visually when flowsheets associated with the same given trend display are sequentially displayed. When a new flowsheet is displayed in the Plant Overview Flowsheet Window 40, the system checks the current trend set to determine whether the current trend set supports the new flowsheet; if so, it remains on the display in the Plant Overview Trend Window 42 during the transition of Plant Overview Flowsheet Window 40.

Figure 21:
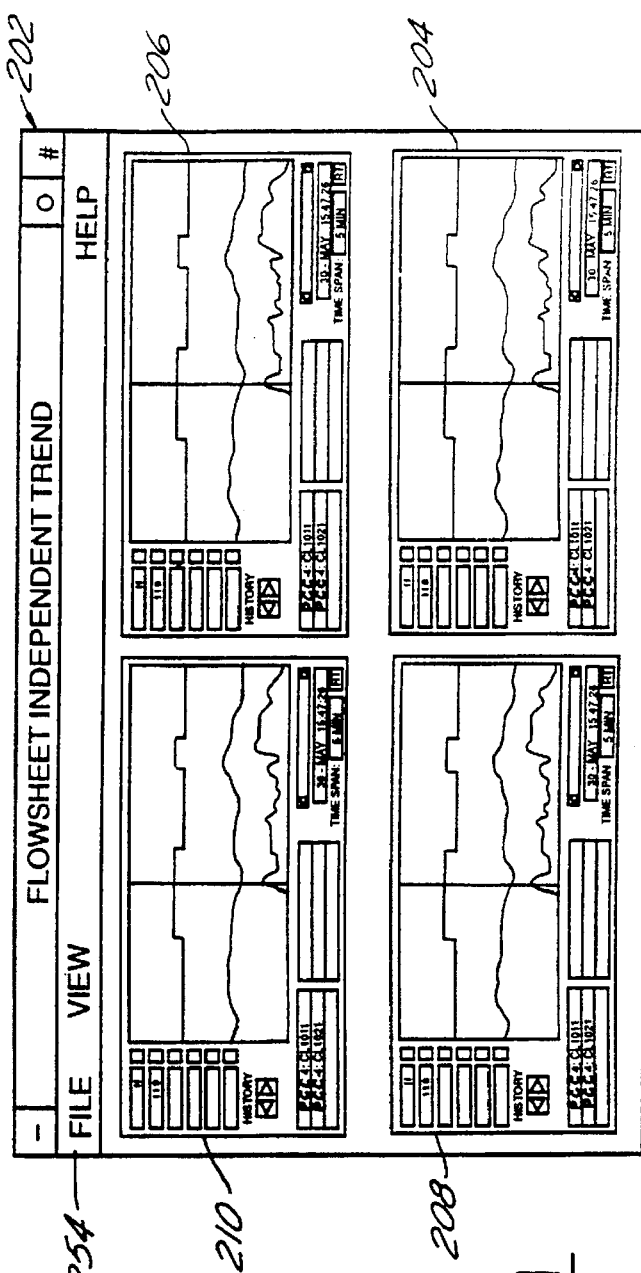
FIG. 21 is a typical Flowsheet-Independent Trend Window.

Referring to FIG. 21, the present invention may allow the operator to define one or more Flowsheet-Independent Trend Windows 202 containing four line graphs 204, 206, 208, 210 including trend lines for selected analog or digital process variables. As will be appreciated by those skilled in the art, the formats for the four line graphs may be identical to the line graphs 196, 198,200 utilized in the Flowsheet-Dependent Trend Window 42. In contrast to the Flowsheet-Dependent Trend Window 42, however, the Flowsheet-Independent Trend Window 202 may display data free of any links with information displayed in any other visible application window. Flowsheet-Independent Trend Windows 202 are displayed on the secondary display 28. They may be opened, defined, positioned anywhere on the display by the operator, re-sized, iconized, or closed at any time.

Figure 22:
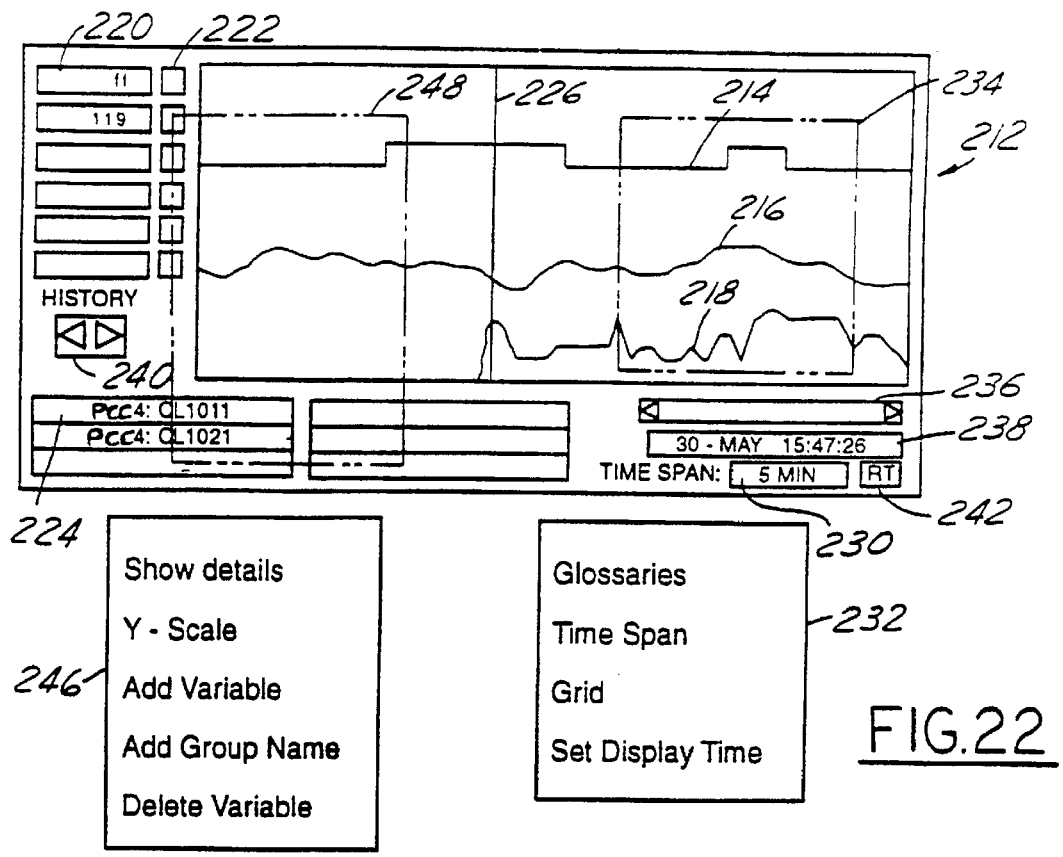
FIG. 22 is a typical line graph from a flowsheet.

Referring to FIG. 22, a typical line graph 212 includes up to six trend lines (three are shown at 214, 216, and 218) corresponding to digital or analog time-correlated data point primitives (or variables). The line graph 212 has two scaled axes. The vertical axis (also called the Y-axis) represents the value of the process variable, and the horizontal axis (also called the t-axis or time axis) represents time. For each trend line displayed in a graph, additional information about the trended variable is visible in the associated value box 220, color box 222, and name box 224. The value box 220 shows the actual value of the variable at the time position of the value ruler 226. The value box is preferably a standard graphic symbol that can also appear within a graphic sheet displayed in either the Plant Overview Flowsheet Window 40 or in an additional flowsheet window on the secondary display 28. The value box 220 also preferably has an associated common element pop-up menu which may be activated by clicking on the value box, or by clicking on the graphic symbol associated with the process value displayed in a graphic sheet. Once activated, the common element pop-up menu allows the operator to implement any of the common element operations on the variable. The color box 222 displays a color matching the color of the trend line associated with that variable. Alternatively, the color box could include a specific line type or thickness to differentiate the display trends 214, 216, and 218.

The system also preferably includes a trend line color box pop-up menu 246 which may be activated by clicking on the color box for a particular variable's trend line within one of the line graphs in a trend window 42, 202. When activated, the color box pop-up menu appears superimposed over the line graph 212, at 248 and preferably includes commands which allow for viewing and modifying the parameters associated with the trended variables. These commands typically include a "Show Details" command which invokes a dialog box that presents information relating to a particular value, the units of measurement for this variable, the current setting for the 100% reading on the Y-scale for this variable, and the current setting for the 0% reading on the Y-scale for this variable.

A variable can be added to a line graph by clicking, for example, on a graphic symbol within a flowsheet or anywhere the variable can be accessed, calling up the common element pop-up menu and implementing the "Remember ID" command. The operator may then click on a selected color box within a line graph in the trend window, call up the associated trend line color box pop-up menu, and implement the "Add Variable" command. The selected variable then becomes the trended variable in the line graph at the corresponding color box. It should be noted that the system allows for removal of a trended variable from a line graph clicking on the trend's color box and choosing the "Delete Variable" command from the color box pop-up menu 246.

A command which is also preferably included in the color box pop-up menu 246 is "Y-scale," which, when selected, allows the operator to specify upper and lower values to establish a range for the Y-scale for the associated variable.

It should be noted that variables can be grouped. Any variable set which has been defined as a group can be displayed as a group by a procedure first initialed by clicking on a process element associated with any one of the variables in that group in a flowsheet (or anywhere it can be accessed) to invoke the relevant common element pop-up menu. Once invoked, the "Remember ID" command may be selected to store the variable temporarily as a pointer to the group. By then clicking on the color box pop-up menu 246, the "Add Group" command may be invoked to display the group relating to the temporary pointer and create new trend lines for that group of variables in the line graph 212. It will be appreciated by those skilled in the art that by assigning variables to groups, variables having close interaction or inter-dependence within the process flow, may be quickly and easily displayed to monitor a specific segment of the process.

Figure 23:
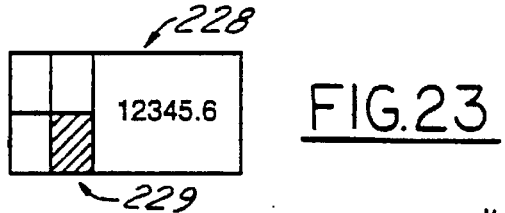
FIG. 23 is a schematic showing an alternative value box including an associated status indicator.

As shown in FIG. 23, an alternative form of the value box 228 in one contemplated mode may include additional graphical information about the variable, such as a status box 122 associated with that variable.

Referring again to FIG. 22, the time span of the line graph 212 is preferably indicated in the time span box 230. The total time span viewed may be specified by the operator by calling a line graph pop-up menu 232 which may be activated by clicking anywhere on the graph area of the window 212. When activated, the line graph pop-up menu appears superimposed on the graph where indicated at 234. The line graph pop-up menu 232 preferably provides options for manipulating the display format for the graph area.

A number of other features are included in the line graph which allow the time axis to be manipulated. The time scroll bar 236 is a conventional graphic scroll bar which allows the operator to position the value ruler 226 at the desired point in time. The time value box 238 indicates the date and time corresponding to the current position of the value ruler 226. The history scroll buttons 240 allow the graph to be positioned back in time.

In the preferred embodiment, clicking one of the history scroll buttons 240 repositions the start of the graph backward or forward (depending on the button pressed) by an amount equal to half of the time span selected for the visible portion of the time graph. The Return To Real-time button 242, when implemented, repositions the time axis to display the data in real-time. As previously indicated, in the preferred embodiment of the system, the time span of the displayed portion of the time axis may be selected from a pre-defined set of alternative time spans, and thus may vary, to be unique for each line graph 212.

Figure 24:
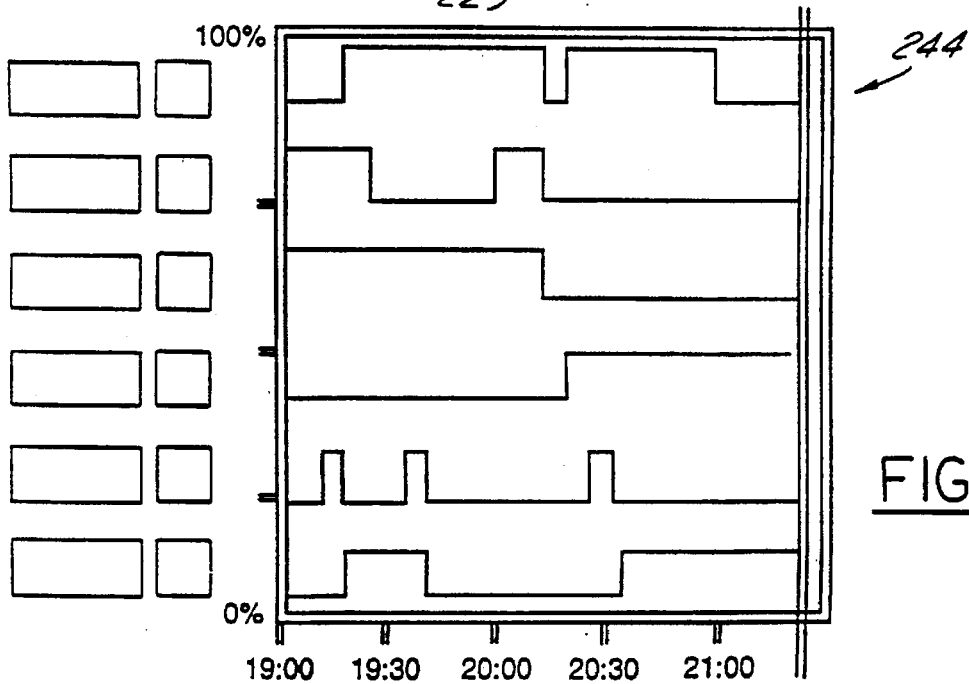
FIG. 24 is a schematic of a trend window showing trend lines for digital values.

It should be noted that for digital values such as 214, a time-correlated step function line is preferably used for the trend, with false being represented by a relatively low value within a band, and true being represented by a relatively high value within a band. To help insure that each digital trend line is visible, a separate band, aligned with the color box 222 corresponding to the particular variable, may be allocated for use for each digital step function line in the group. A typical line graph 244 having six digital variables is displayed in FIG. 24.

Referring again to FIGS. 20–22, the system 20 preferably includes a trend definition file which represents a stored definition for all the line graphs within a particular trend window. The trend definition file includes identification of the one to six variables that are to be trended in each line graph, the Y-axis scale limit setting for each variable, and the current time span width setting for the time-axis display for each line graph. Thus, the line graphs displayed in a trend window at any particular time are from one and only one trend definition file. It should be noted that, although a particular graphic sheet displayed in the Plant Overview Flowsheet Window 40 preferably has a unique set of line graphs (from a trend definition file) associated with it and displayed in the Flowsheet-Dependent Trend Window 42, other graphic sheets may also reference the same trend definition file. When the Plant Overview Flowsheet Window 40 is alternated between two or more graphic sheets that share a common trend definition file, the trend window is preferably not reconstructed on the primary display 26. Instead, the trend window will simply continue to plot the line graphs from the shared trend definition file as they are currently displayed.

A Flowsheet-Independent Trend Window 202 can be created in any one of the following ways:

1. An empty window (with no variable assigned to any of the line graphs) can be opened. The operator can then add selected variables to the graphs as further described hereafter.
2. In a best contemplated embodiment, a window can be created containing the same three line graphs currently displayed in the Flowsheet-Dependent Trend Window 42. If created in this manner, it should be noted that the fourth line graph in the two-by-two Flowsheet-Independent Trend display will be blank.
3. A trend window can be created using an existing trend definition file.

Other trend window commands are preferably included in a line graph pop-up menu 232 which may be invoked by clicking anywhere in the graph area of the line graph 212, and appears superimposed over the line graph 212 at, for example, 234. The line graph pop-up menu 232 includes commands useful in manipulating the display format for the selected graph area. The menu may include a "Time Span" command which sets the magnitude of the time span for the line graph 212; this time span is indicated in the time span box 230. The menu further includes a "Set Display Time" command which sets the start point display time for all of the trend lines in the line graph 212; this start point is indicated at 238. It will be appreciated by those skilled in the art that these two commands can be used in combination to effectively define the display time range to display the trend line of the PCC variable for a selected historical period having both the beginning time and ending time prior to the current time. This menu also typically includes a "Glossaries" command which provides a one-line glossary for each of the trended variables in a displayed set. Another command preferably included on the line graph pop-up menu 232 is "Grid." When selected, "Grid" cascades to another menu which provides an option to display or not to display the T-axis and/or Y-axis grid lines on the line graph 212.

It will be appreciated by those skilled in the art that other commands may be included in the color box pop-up menu 246 and/or the line graph pop-up menu 232 to provide options for manipulating the data and display formats respectively for the line graph 212.

Historical (time-correlated) data utilized for the non-real time portion of the trend line graphs is preferably obtained from a history server, which, for example, may be a portion of the PI system (100 in FIG. 2) networked for communication with the operator station 20. It will be appreciated by those skilled in the art that the granularity of historical data will typically be more coarse than the real time sampling granularity and represents an appropriate balance of resource utilization and useful data precision.

Referring again to FIGS. 20 and 21, the Flowsheet-Dependent Trend Window 42 and the flowsheet Independent Trend Window 202 may also include a menu bar 254 containing menus which allow for implementation of trend window-related commands. For example, a "File" menu is preferably implemented from the menu bar 254 by clicking on File. The File menu typically includes an "Open" command which invokes a file selection dialog box and loads the selected trend definition file into the current window after selection is made. The File menu also typically includes a "Save" command which saves the current trend definition file including any modifications that have been performed while the line graphs corresponding to that trend definition have been displayed in the window, a "Print" command which prints the contents of a current trend window, and a "Close" command which closes the current trend window. It should be noted that the "Close" command is preferably not available in the Flowsheet-Dependent Trend Window 42, since that window is permanently open on the primary display 26.

The menu bar 254 may also include a "View" menu which includes commands which alter, or add to, information displayed in the current window. The View menu preferably includes the "Glossaries" command which activates a glossary box which displays a one line glossary for all of the variables being trended in the window, a "Grid" command which cascades to a dialog box of toggle switches for the Y-axis and time axis. The toggle switches for the Y-axis and time axis may be activated to display horizontal or vertical grid lines respectively for all of the line graphs in the window. The View menu also preferably includes a "Now" command which returns the value ruler 226 to the now (real time) position for all the line graphs in the window, and a "Format" command which invokes a dialog box containing "analog format" and "digital format" options. The analog format and digital format option provide a group of buttons which may be clicked on to control the format of the display of analog and digital values, respectively, in the current window.

The menu bar 254 may also include a "Help" menu (not shown) which includes commands for invoking on-line documentation relating to the information displayed in the current window and of the above-described trend window commands.

As previously described, pop-up menus are also preferably provided, and are implemented by clicking within the graphing area of a line graph. When activated, the pop-up menu preferably displays commands, such as those in the File and View menus described above, which can be invoked for that particular line graph. It will be appreciated by those skilled in the art that the above-described pop-up menus as well as other pop-up menus which may be implemented to provide quick access to manipulating display options, allow for greater flexibility in varying the mode and content of display of line graphs within a trend window.

And, as will also be appreciated by those skilled in the art, the incorporation of pop-up menus, pull-down menus, and cascaded dialog boxes, through menu bars associated with each of the SECTIONS Overview Window 36, SEQUENCES Overview Window 38, Plant Overview Flowsheet Window 40, Flowsheet-Dependent Trend Window 42, and the optional windows displayed on the secondary display 28, allows for quick, simple incorporation and/or modification of information being displayed by the operator station 20. In addition, the simultaneous display of varying levels of detail current process information for selected portions of the manufacturing process also allows for quick identification of potential problem areas and the ability to quickly view and trend information in greater detail for those problem areas. Thus, the system of the present invention allows an operator who would otherwise be deluged with massive process information to efficiently manage that information and effectively supervise and control one or more large and complex automated manufacturing processes.

Referring generally to FIGS. 25–32, the operator station 20 of the present invention provides a variety of windows which allow the operator to manage alarms, elements in manual mode, and events generated by the PCCs. Referred to hereinafter generally as the Alarm/Manual/Event (or AME) windows, these windows allow the operator to observe and acknowledge active alarms, monitor process inputs and outputs in the "manual" state, and monitor PCC unsolicited events, both as they are occurring and in historical "Events Lists". And, as further described hereinafter, the operator station 20 of the present invention preferably provides filtering and sorting capabilities to allow the operator to tailor the amount of information and the order in which the information is presented in the various AME windows.

The AME windows manage two basic types of data—Alarm/Manual variables and events.

An Alarm variable has an associated state—ON/OFF (or TRUE/FALSE, or, in the case of a manual variable Manual/Automatic)—that describes the actual situation at any instant in time. The "ON" state for an alarm variable is also referred to as the active state. The "OFF" state is referred to as the cleared state. Alarm variables that become ON have to be acknowledged by the operator. Therefore, the alarm can be Active/Acknowledged, Active/Unacknowledged, or Cleared. The values and conditions of these variables are obtained directly from the PCCs for those SEQUENCES defined in the Operator Station.

Alarm variables may have a plurality of severity levels. For example, the most severe alarm level might be designated "Shutdown" with progressively less levels of severity identified as "Emergency", "Warning", and "Alert". The value of some alarm variables, such as one associated with a process step, may also be a minimum or maximum time constraint, referred to hereinafter as a "Min/Max alarm."

Events are generated when there is a transition in the state of a selected PCC variable. From the operator station perspective, events are unsolicited notifications from the PCC which need not be acknowledged by the operator. Events may be generated for changes in selected analog or digital values, changes from automatic control to manual control or vice versa. Events may also record the nature and type of change in a SEQUENCE. Events may also notify the operator of the existence or change in state of a selected alarm, of a change in, or of the occurrence of, any other event useful or important to the operator.

In the preferred embodiment of the operator station 20 of the present invention, AME information is presented to the operator via six windows. There are four windows that display information relating to Alarm/Manual Variables—the Unacknowledged Alarm Overview Window (FIG. 25), the Active Alarms Window (FIG. 26), the Elements-In-Manual Window (FIG. 27, and the Alarm Grid Flowsheet Window (FIG. 28). There are preferably at least two windows that display Event information—the Event Browser Window (FIG. 29), and the Real-Time Event Capture Window (FIG. 30).

Figure 25:
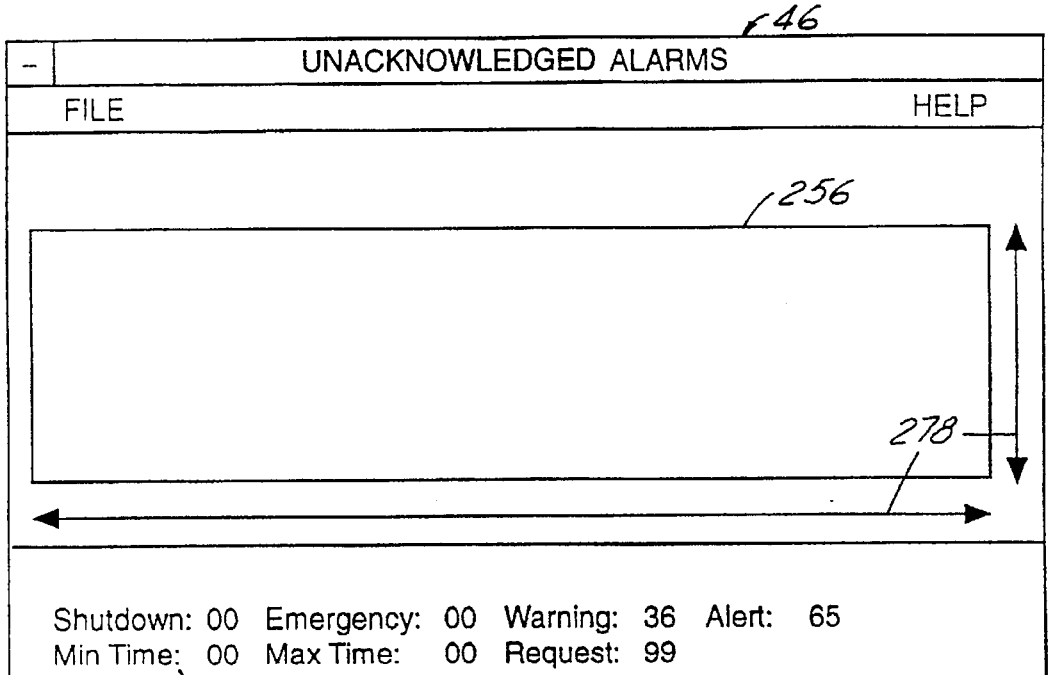
FIG. 25 is a typical Unacknowledged Alarm Overview Window.

Referring to FIG. 25, the operator station 20 preferably includes an Unacknowledged Alarm Overview Window 46. As previously described, the Unacknowledged Alarm Overview Window 46, as with other Plant Overview Windows, preferably has a fixed size and position and cannot be iconized, moved or closed. This window is part of the startup screen of the secondary display 28 of the operator station 20. And, as with the other Plant Overview Windows 36–42, menus that are "popped up" in front of this window are visible only so long as the mouse pointer is in the window. The list box 256 identifies all active but unacknowledged alarms generated by all the PCCs which the operator station monitors. It should be noted that the information listed in the unacknowledged alarm window will remain fully visible whenever there are any unacknowledged alarms. A summary box 258 may also be provided in this window. The summary box 258 contains a summary of the number of active alarms (both acknowledged and unacknowledged) by alarm type. The alarms listed in the list box 256 are sorted by time, with the most recent alarm appearing at the bottom of the window. No other type of sorting or filtering (hereinafter described) is allowed in the Unacknowledged Alarm Overview Window 44.

Each alarm listed in the list box 256 typically contains the following data:

(1) Time of occurrence;
(2) Source (identifying PCC);
(3) SEQUENCE abbreviation or SEQUENCE number;
(4) Identification of origin (where, for example, PCCs are dual redundant systems);
(5) Delta Time (specifying difference in the time of occurrence between each of the dual PCC systems);
(6) Alarm severity;
(7) Alarm abbreviation; and
(8) One-line glossary describing alarm.

In the preferred embodiment of the operator station 20, the operator can acknowledge the active alarms displayed in the window. The operator can invoke the standard common element pop-up menu and select the "Acknowledge" option. After the operator has acknowledged an alarm, it disappears from the Unacknowledged Alarm Overview Window (preferably only after the operator station 20 receives feedback from the PCC that it has set the corresponding PCC variable). The acknowledged state for the active alarm is indicated via a text indicator in the Active Alarms Window, as hereinafter described in connection with FIG. 25.

The Unacknowledged Alarm Overview Window 46 also may include a menu bar 260 which includes an Options menu. When activated, the Options menu preferably, in a best contemplated mode, includes the following commands:

The "Active Alarms" command activates a new Active Alarms Window on the secondary display 28, displaying all Active Alarms (Acknowledged and Unacknowledged).

The "Elements-In-Manual" command creates a new Elements In Manual Window on the secondary display 28.

The "Alarm Grid Flowsheet" command displays the Alarm Grid Flowsheet for the operator station 20 in a Flowsheet Window on the secondary display 28.

The "Event Browser" command creates a new Event Browser Window on the secondary display 28.

Figure 26:
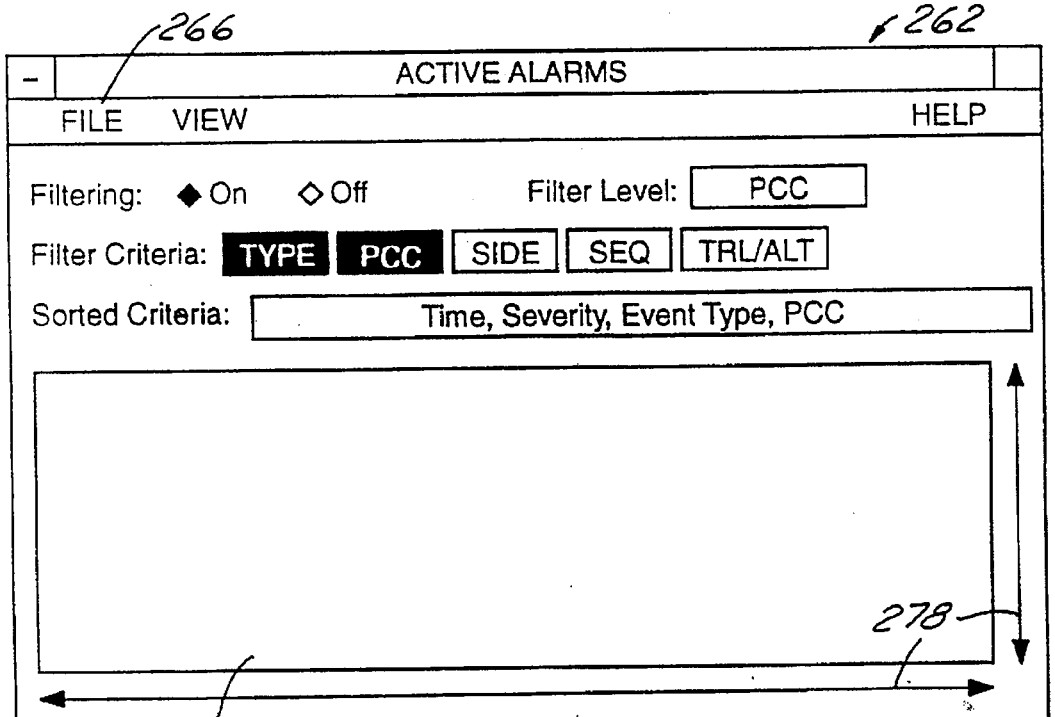
FIG. 26 is a typical Active Alarms Window.

Referring now to FIG. 26, the operator station 20 of the present invention preferably includes a Primary Active Alarms Window 262 which displays a list of all PCC generated active alarms (Acknowledged as well as Unacknowledged) for SEQUENCES of SECTIONS controlled by the operator station 20. The Primary Active Alarms Window 262 is preferably part of the operator station startup, appearing on the Secondary Display 28. It can be iconized, but it cannot be closed. There can be additional Active Alarms Windows created via the Options menu in the Unacknowledged Alarm Overview Window 46. These windows are identical to the Primary Active Alarm Window except for the above-noted features.

Active Alarms Windows such as the Primary Active Alarms Window 262 preferably appear on the Secondary Display 28 and can be moved. With the exception of the Primary Active Alarms Window 262, Active Alarm Windows may be closed by the operator or may be covered by other windows on the display. They can also be re-sized, shrunk to an icon, or moved. The active alarms displayed in these windows preferably appear sorted by time and severity (in that order), with the most recent, most severe alarm appearing at the bottom of the alarm box 264. Other sorting and filtering parameters (both hereinafter described) may be defined for an Active Alarms Window by invoking the sorting or filtering dialog boxes respectively.

The Active Alarms Window 262 preferably contains a list of all active alarms generated by all the PCCs for which the operator station 20 is assigned in the alarm box 264.

The operator can acknowledge an active alarm while in the Active Alarms Window 262 via activation of the common element pop-Up menu.

The Active Alarms Window 262 may also include a menu bar 266, from which one or more commands may be activated. The View menu may be included on the menu bar 266, and provides at least the following commands:

The "Filter Criteria" command activates an Alarm/Manual/Event filtering dialog box which allows the operator to select filtering criteria for the window. The dialog box preferably includes an "Event Category Filtering" command which allows selection of one or more event categories, an "Event Type Filtering" command which allows for selection of one or more event types from within a chosen event category, and a "PCC Filtering" command which allows for selection of one or more PCCs;

The "SEQUENCE Filtering" command allows selection of one or more SEQUENCES; and

The "Element Filtering" command allows the operator to enter the name of a specific PCC variable.

The View menu may also include the "Sort Order" which, when invoked, displays an AME sorting dialog box, allowing the operator to adjust the sort order of alarms displayed in the Active Alarms Window 262. The operator may indicate the priority for sorting of each criteria, and may indicate whether the sort order is ascending or descending. The AME variables may be sorted according to the following criteria:

Severity (for alarms only)
Time
PCC SEQUENCE
Event Type
Element

Figure 31:
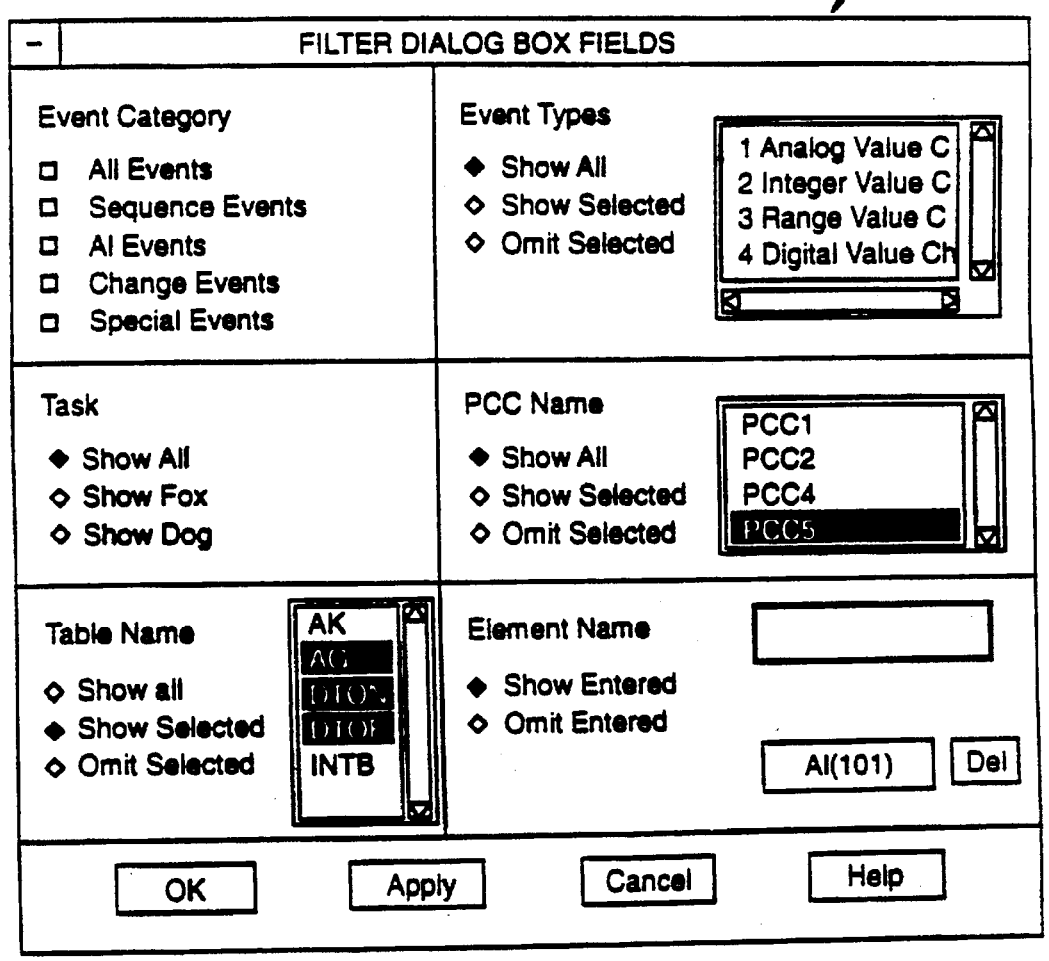
FIG. 31 is a typical Filtering Dialog Box.

It will be appreciated for those skilled in the art that the filter dialog box allows the operator to alter the amount of information that is displayed in any of the Active Alarm Windows. The operator may choose to display all or selected AME information for a specific PCC, or a specific SEQUENCE, or for specific event categories. In the preferred embodiment, once a set of filter criteria has been selected for a specific window, the criteria are remembered until the window is closed. Thus, while the operator may disable filtering by activating a "No Filtering" option from the View menu, the filtering, when reactivated, is performed according to the last defined parameters for that window. A typical alarm and event log filter dialog box 268 is shown in FIG. 31.

Figure 32:
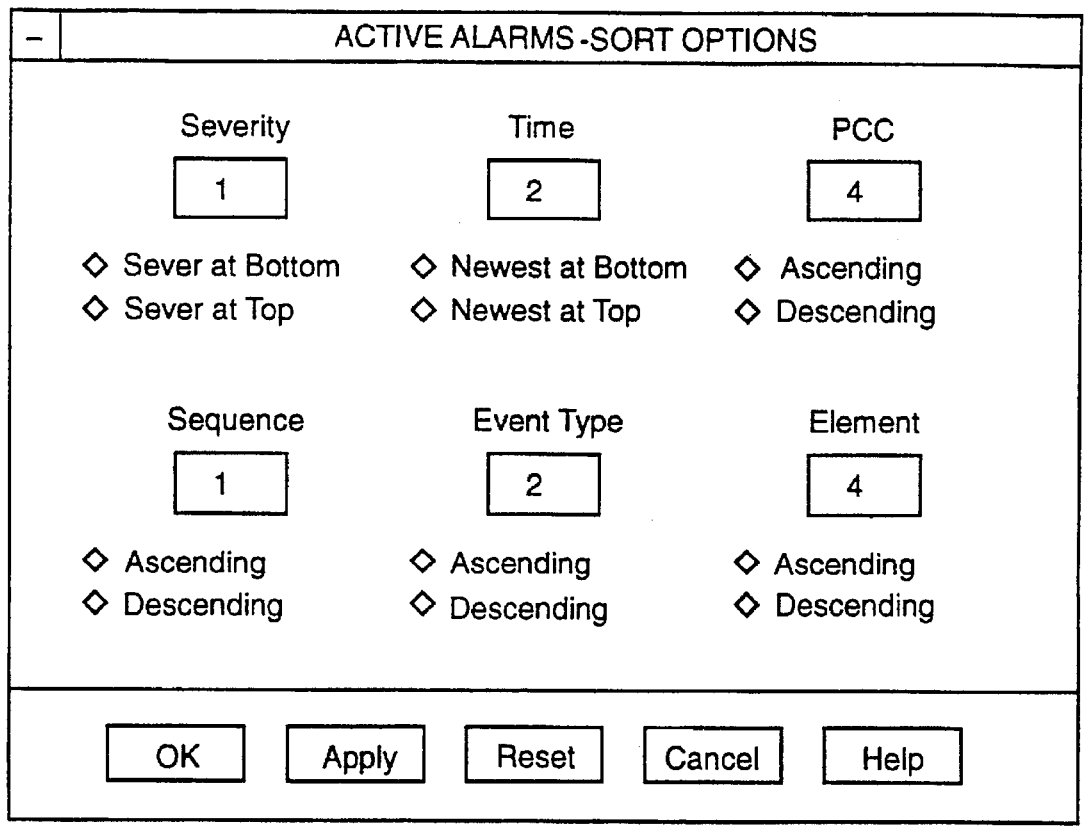
FIG. 32 is a typical Sorting Dialog Box.

Any of the AME information displayed in the active alarms windows may be sorted according to preselected criteria by invoking the sort order command from the View menu as described above. As with the filtering function, once a set of sort criteria has been defined for a selected window, that criteria is utilized until the window is closed. A typical sort dialog box 270 is illustrated in FIG. 32.

Figure 27:
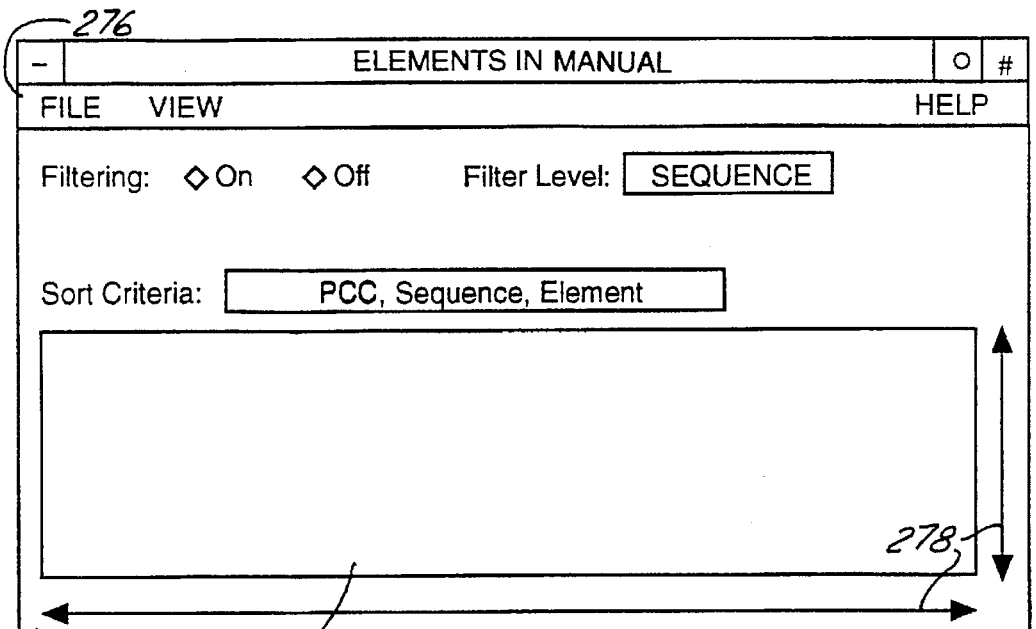
FIG. 27 is a typical Elements-In-Manual Window.

Referring now to FIG. 27, the operator station 20 of the present invention preferably includes an Elements-In-Manual Window 272. This window may be created by the operator and displays all of the PCC variables that are "in manual" (that is, for those elements whose values have been set manually by the operator through the operator station 20 rather than through undetectable overrides at the field devices) for the PCC for which the operator station is being used as an associated system. In the preferred embodiment, the selected elements are displayed in the elements list box 274 which, by default, sorts the elements by PCC, then by SEQUENCE, and then by element. As with the active alarms windows, other sorting and filtering parameters may be defined by invoking sorting and filtering dialog boxes respectively via the View menu option on the menu bar 276. Also, as with the other AME windows, scroll bars 278 may be provided to allow for scrolling through the listed elements when the list is greater in size than the element list box 274.

Referring now to FIG. 28, the operator station 20 of the present invention preferably includes an Alarm Grid Flowsheet Window 280, which includes a plurality of alarm boxes 282. Each of the alarm boxes 282 is a process primitive associated with an alarm monitored by the operator station 20. The alarm boxes are preferably grouped in a logical order based upon SECTIONS and SEQUENCES which increase the readability of the grid. Each alarm box is also preferably color-coded as a function of the state of the alarm and, if the alarm is active, the alarm severity. In the Alarm Grid Flowsheet Window 280 of FIG. 28, all of the alarms have been grouped in columns corresponding to SECTIONS, with the SECTION name and/or number (i.e. RM, Water, PSS, #1, #2, #3, #4, #5, Storage, Buta, SAN) appearing at the top of each column. In addition, the columns are subdivided into rectangles, with each rectangle corresponding to a SEQUENCE. For example, there are 13 alarms associated with SEQUENCE 04B, SECTION RM in rectangle 284.

Selection of any alarm box 282 in the grid will invoke the common element pop-up menu associated with the process primitive represented by that box, thereby providing quick and easy access to detailed information about the selected alarm. It will be appreciated by those skilled in the art that the fixed graphic representation of all of the alarms monitored by the operator station 20 in the Alarm Grid Flowsheet Window 280 provides the operator with a pattern recognition tool which can be utilized to trouble-shoot potential problems in the process.

Figure 29:
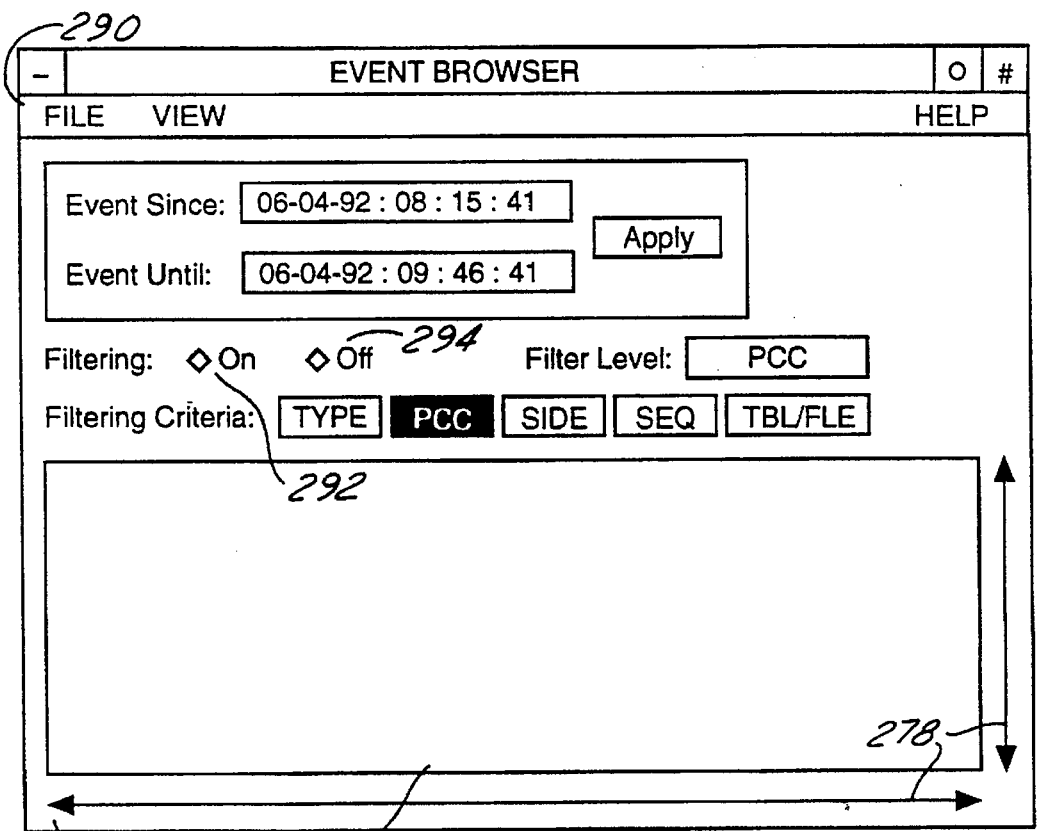
FIG. 29 is a typical Event Browser Window.
Figure 30:
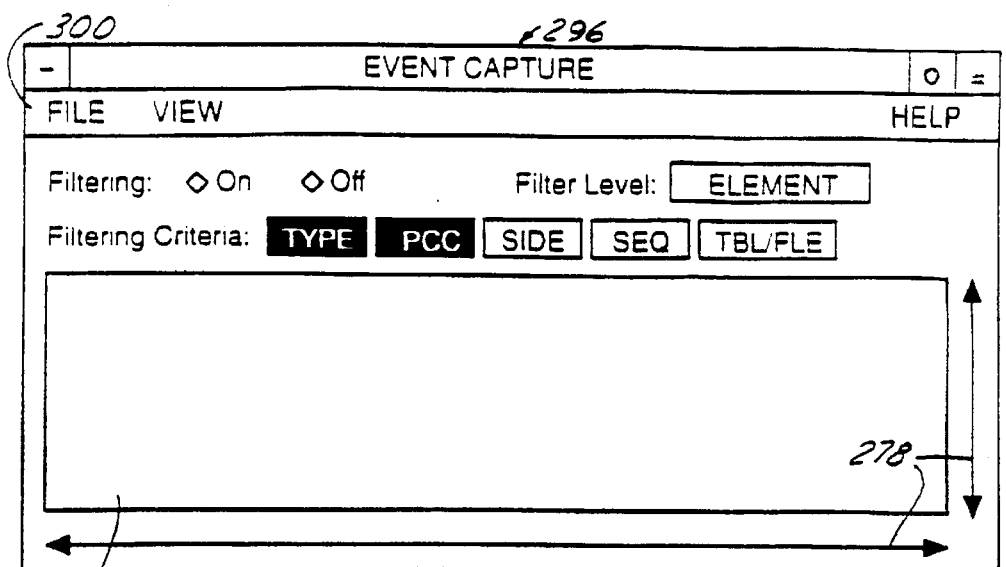
FIG. 30 is a typical Real-Time Event Capture Window.

Referring now to FIG. 29, the operator station 20 of the present invention also preferably includes an Event Browser Window 286 which allows the operator to browse through a history of various events that have occurred in the process monitored by the operator station 20 within a preselected time period, such as the last 24 hours. An Event Browser Window 286 maintains an event log list including all incoming events. The events are listed in chronological order as they have occurred with most recent events depicted at the bottom of the event log file displayed in the event log box 288. In the preferred embodiment, more than one Event Browser Window 280 can be created. The window preferably appears on the secondary display 28 and can be moved, shrunk, covered by other windows, or closed by the operator. The Event Browser Window 286 displays only a historical log; it does not capture new events as they occur. Filtering is preferably provided to permit a selected view into the event log file. In addition, the operator is allowed to specify a starting time and stopping time defining the extent of the historical record displayed in the window. As with the other AME information windows, scroll bars 278 may be provided to allow for viewing of an event log that is larger is size than the event log box 288.

The Event Browser Window 286 preferably also includes a View menu which may be activated via the menu bar 290. When activated, the View menu provides access to the "Filter Criteria" command which, when activated, displays a filtering dialog box which can, in turn, be utilized to implement the filtering as described above. Based upon the event categories chosen during filtering, the following types of event information can be presented in, or excluded from, the Event Browser Window 286:

All events;

Alarm events;

SEQUENCE events;

Change events (including manual Change events); and

Special events.

As with the other AME windows, filtering may be turned on or turned off via radio buttons 292, 294 provided in the Event Browser Window 286.

The Event Browser Window 286 initially appears empty on the secondary display 28. The operator is then prompted to choose a time range for event after which an unfiltered events log file for that time range is created and displayed.

Another command preferably made available through the Main Menu 44 is the "Real-Time Event Capture" command. Activating this command yields a filter dialog box which includes various filtering options to be applied to the events that are to be displayed in a new Real-Time Event Capture Window (described below). Once the filtering criteria is selected, the events are displayed in chronological order such as the most recent appears at the bottom of the window.

Referring now to FIG. 30, the operator station 20 of the present invention also preferably includes a Real-Time Event Capture Window 296 which displays some (if filtered) or all of the events as the occurrence of these events is transmitted from the PCCs to the operator station 20. As with the Event Browser Window 286, the events are listed in an Event Capture List Box 298 provided with scroll bars 278 to allow viewing of a list greater in size than the Event Capture List Box 298. Also, as with the Event Browser Window 286, more than one Real-Time Event Capture Window 296 may be created, and the window(s) may be moved, resized, shrunk to an icon, covered by other windows, or closed by the operator. Unlike the Event Browser Window 286, the Real-Time Event Capture Window 296 does not display historical data. Events are displayed as the information is received by the operator station 20 from the PCC, with the most recent event preferably appearing at the bottom of the window. As with the Event Browser Window 286, no sorting is allowed in this window. Filtering is provided to allow the operator to select a subset of events in real-time via the filter dialog box invoked by activating the View menu from the menu bar 300 in the same manner described above in connection with the Event Browser Window 286.

Thus, the operator station 20 of the present invention provides several ways for the operator to quickly and easily access, monitor, and/or change manufacturing process information. For example, the Main Menu Window 44 may be utilized to create additional flowsheet windows or additional trend windows on the secondary display 28, or to monitor or change process primitives directly through the Select command. Alternatively, this information can be accessed indirectly through menu bar commands on, for example, the Plant Overview Flowsheet Window 40 or the Flowsheet-Dependent Trend Window 42, as well as by activating common element pop-up menus by clicking on common elements appearing in any of the windows. This multiple access provides the operator with flexibility in quickly accessing and manipulating the massive data being monitored by the operator station 20 and provides more effective real-time supervision of the plant.

In the preferred embodiment, the graphics described in the operator station 20 of the present invention, including the various windows, icons, graphs, and other graphical elements described herein, are generated and displayed through suitably programmed graphics software which is preferably written in the C language. SL-GMS graphics systems, available from Sherrill-Lubinski Corp., of Corte Madera, Calif., were employed to create the graphic symbols. As will be appreciated by those skilled in the art, any of a variety of conventional programming techniques may be utilized to store, select, and analyze the selected process data from which the process information including the numerical values of the process data variables and the infological graphics described herein may be generated and updated continuously on the primary display 26 and secondary display 28.

In a best contemplated mode, the operator station of the present invention may include a window which facilitates the display of the application-specific control codes in the PCC in symbolic form, such as is described in U.S. Ser. No. 861,371, filed Mar. 31, 1992 for a "Global Process Control Information System and Method." This application is hereby incorporated by reference herein.

Those skilled in the art will appreciate that the operator station 20 of the present invention provides an environment which utilizes the graphical icons and display formats of the present invention and the SECTION/SEQUENCE process domains to organize and present information distilled from massive and ever-changing physical inputs and PCC data variable values through standardized, simplified and recognizable infological structures such as the various windows, SECTION indicators, SEQUENCE indicators, status indicators, PFUs and other graphical indicia which convey real-time process information in a human-manageable manner.

While the best mode for carrying out the invention has been described in detail, those familiar with the art to which this invention relates will recognize various alternative designs and embodiments for practicing the invention as disclosed by the following claims.

What is claimed is:

1. An operator station for a manufacturing process control system including at least one dedicated process control computer for monitoring and controlling at least one SECTION and at least one SEQUENCE of the manufacturing process, the operator station comprising:

communication means for two-way communication of process data between the operator station and at least one of the process control computers; and display means including,
a first window defining a display area including at least one infological object which is a composite derived from selected parameters associated with a SECTION, and
a second window defining a display area including at least one infological object which is a composite derived from selected parameters associated with a SEQUENCE.

2. The operator station of claim 1 wherein the display means further includes a window defining a flowsheet display area including at least one flowsheet including a graphic representation of a portion of the process.

3. The operator station of claim 1 wherein the display means further includes a window defining a trend display area including at least one graph displaying the value of at least one selected process variable for a preselected period of time.

4. The operator station of claim 1 further including data input means for selecting one of a set of preselected process variables controlled by one of the process controlled computers and indicating a value for the selected variable; and logic for substituting the input value for that variable as the value to be monitored and controlled by the process control computer.

5. In an operator station for a manufacturing process control system including at least one dedicated process control computer for monitoring and controlling at least one SEQUENCE of the manufacturing process, an apparatus for generating a display representing the current status of a selected SEQUENCE of the process, the apparatus comprising:

logic for determining the current value of the critical success factor as a function of preselected parameters associated with the process;

logic for determining the trailing average value of the critical success factor over a preselected period of time; and means for displaying graphic indicia of the critical success factor including, a circle divided into two contrasting shades forming a pie chart wherein the area of the pie defined by one of the shades is a function of the value of the critical success factor, and a radial line segment that indicates the value of the trailing average of the critical success factor.

6. An operator station for a manufacturing process control system including a network of at least one dedicated process control computer for monitoring and controlling at least one SEQUENCE of the manufacturing process and a communications processing system for routing data from the process control computer to other authorized systems on the network, the operator station comprising:

a communication link for two-way communication of process data between the operator station and the communications processing system;

at least one display including, a SECTION display area including information relating to at least one of the SECTIONS of the process, the information including a SECTION indicator for at least one of the SECTIONS supervised by the operator station, the SECTION indicator comprising text identifying the SECTION by name and graphic indicia of the overall success of the SECTION, the graphic indicia including a circle divided into two contrasting shades forming a pie chart wherein the area of one of the shades varies in size as a function of the current condition of operation of the SECTION, and a radial line segment that indicates the trailing average of the condition of operation of the SECTION, and a SEQUENCE display area including information relating to one or more SEQUENCES of the process;

a data input device for selecting one of the SECTIONS displayed in the SECTION display area; and logic for displaying information in the SEQUENCE display area corresponding to all of the SEQUENCES in the selected SECTION of the process.

7. The operator station of claim 6 wherein the SECTION indicator further includes an active acknowledged alarm symbol which indicates the total number of active acknowledged alarms in all the SEQUENCES in the SECTION.

8. The operator station of claim 7 wherein the preselected parameters include the name of the step of the process, the time in the current step, the current recipe number, the next recipe number, the number of active shutdown alarms, the number of active emergency alarms, the number of active warning alarms, the number of active alert alarms, the number of active request alarms, the number of inputs in manual mode, and the number of outputs in manual mode.

9. An operator station for a manufacturing process control system including a network of at least one dedicated process control computer for monitoring and controlling at least one SEQUENCE of the manufacturing process and a communications processing system for routing data from the process control computer to other authorized systems on the network, the operator station comprising:

a communication link for two-way communication of process data between the operator station and the communications processing system;

at least one display including, a SECTION display area including information relating to each of one or more SECTIONS of the process, the information including a SECTION indicator for each SECTION supervised by the operator station, the SECTION indicator comprising a text identifying the SECTION by name, graphic indicia representing the critical success factor symbol, graphic indicia representing the status of selected shutdown flags in the SECTION, graphic indicia representing the status of selected emergency flags in the SECTION, graphic indicia representing the status of selected alarms, and a SEQUENCE display area including information relating to one or more SEQUENCES of the process;

a data input device for selecting one of the SECTIONS displayed in the SECTION display area; and logic for displaying information in the SEQUENCE display area corresponding to all of the SEQUENCES in the selected SECTION of the process.

10. An operator station for a manufacturing process control system including a network of at least one dedicated process control computer for monitoring and controlling at least one SEQUENCE of the manufacturing process and a communications processing system for data from the process control computer to other authorized systems on the network, the operator station comprising:

a communication link for two-way communication of process data between the operator station and the communications processing system; at least one display including, a SECTION display area including information relating to at least one of the SECTIONS of the process, and a SEQUENCE display area including information relating to one or more SEQUENCES of the process, the information including a SEQUENCE indicator for at least one of the SEQUENCES supervised by the operator station, the SEQUENCE indicator comprising text identifying the SEQUENCE by name and graphic indicia of the overall success of the SEQUENCE, the graphic indicia including a circle divided into two contrasting shades forming a pie chart wherein the area of one of the shades varies in size as a function of the current condition of operation of the SEQUENCE, and a radial line segment that indicates the trailing average of the condition of operation of the SEQUENCE;

a data input device for selecting one of the SECTIONS displayed in the SECTION display area; and logic for displaying information in the SEQUENCE display area corresponding to all of the SEQUENCES in the selected SECTION of the process.

11. The operator station of claim 10 further including, data input means for selecting one of the SEQUENCE indicators displayed in the SEQUENCE display area, and a display of numerical data corresponding to preselected parameters for that SEQUENCE.

12. An operator station for a manufacturing process control system including a network of at least one dedicated process control computer for monitoring and controlling at least one SEQUENCE of the manufacturing process and a communications processing system for routing data from the process control computer to other authorized systems on the network, the operator station comprising:

a communication link for two-way communication of process data between the operator station and the communications processing system;

at least one display including,
a SECTION display area including information relating to at least one of the SECTIONS of the process, and
a SEQUENCE display area including information relating to at least of the SEQUENCES of the process, the information including a SEQUENCE indicator for each SEQUENCE in a preselected one of the SECTIONS supervised by the operator station, the SEQUENCE indicator comprising text identifying the SEQUENCE by name, a status box symbol, a critical success factor indicator symbol, a shutdown flag symbol, an emergency flag symbol, a Min/Max alarm symbol, and an unacknowledged alarm attention symbol;

a data input device for selecting one of the SECTIONS displayed in the SECTION display area; and logic for displaying information in the SEQUENCE display area corresponding to all of the SEQUENCES in the selected SECTION of the process.

13. An operator station for a manufacturing process control system including at least one dedicated process control computer for monitoring and controlling at least one SECTION including at least one SEQUENCE of the manufacturing process, the operator station comprising:

a communication link for two-way communication of process data between the operator station and at least one of the process control computers;

at least one display including,
a first window defining a display area including information relating to at least one SECTION of the process, and wherein said information includes a SECTION indicator for at least one of the SECTIONS supervised by the operator station, the SECTION indicator comprising text identifying the SECTION by name and graphic indicia of the critical success factor representing overall success of the SECTION, the graphic indicia including a circle divided into two contrasting shades forming a pie chart wherein one of the shades defines a pie chart portion which varies in size as a function of the current value of the critical success factor, and a radial line segment that indicates the trailing average of the critical success factor;

a second window defining a display area for displaying information relating to one or more SEQUENCES of the process;

a data input device for selecting one of the SECTIONS displayed in the first window; and logic for displaying information in the second window corresponding to all of the SEQUENCES in the selected SECTION of the process.

14. An operator station for a manufacturing process control system including at least one dedicated process control computer for monitoring and controlling at least one SECTION including at least one SEQUENCE of the manufacturing process, the operator station comprising:

a communication link for two-way communication of process data between the operator station and at least one of the process control computers;

at least one display including,
a first window defining a display area including information relating to at least one SECTION of the process, the information including a SECTION indicator for each SECTION supervised by the operator station, the SECTION indicator comprising text identifying the SECTION by name, a status box symbol, a critical success factor indicator symbol, a shutdown flag symbol, an emergency flag symbol, a Min/Max alarm symbol, and an unacknowledged alarm attention symbol, and a second window defining a display area for displaying information relating to one or more SEQUENCES of the process;

a data input device for selecting one of the SECTIONS displayed in the first window; and logic for displaying information in the second window corresponding to all of the SEQUENCES in the selected SECTION of the process.

15. An operator station for a manufacturing process control system including at least one dedicated process control computer for monitoring and controlling at least one SECTION including at least one SEQUENCE of the manufacturing process, the operator station comprising:

a communication link for two-way communication of process data between the operator station and at least one of the process control computers;

at least one display including,
a first window defining a display area including information relating to at least one SECTION of the process;
a second window defining a display area for displaying information relating to one or more SEQUENCES of the process, and wherein the information includes a SEQUENCE indicator for at least one of the SEQUENCES supervised by the operator station, the SEQUENCE indicator comprising text identifying the SEQUENCE by name and graphic indicia of the critical success factor representing overall success of the SEQUENCE, the graphic indicia including a circle divided into two contrasting shades forming a pie chart wherein one of the shades varies in size as a function of the current value of the critical success factor, and a radial line segment that indicates the trailing average of the critical success factor;

a data input device for selecting one of the SECTIONS displayed in the first window; and logic for displaying information in the second window corresponding to all of the SEQUENCES in the selected SECTION of the process.

16. An operator station for a manufacturing process control system including at least one dedicated process control computer for monitoring and controlling at least one SECTION including at least one SEQUENCE of the manufacturing process, the operator station comprising:

a communication link for two-way communication of process data between the operator station and at least one of the process control computers;

at least one display including,
- a first window defining a display area including information relating to at least one SECTION of the process;
- a second window defining a display area for displaying information relating to one or more SEQUENCES of the process, the information including a SEQUENCE indicator for each SEQUENCE in a selected SECTION supervised by the operator station, the SEQUENCE indicator comprising text identifying the SEQUENCE by name, a status box symbol, a critical success factor indicator symbol, a shutdown flag symbol, an emergency flag symbol, a Min/Max alarm symbol, and an unacknowledged alarm attention symbol;

a data input device for selecting one of the SECTIONS displayed in the first window; and logic for displaying information in the second window corresponding to all of the SEQUENCES in the selected SECTION of the process.

* * * * *